(12) United States Patent
Yoon et al.

(10) Patent No.: US 7,760,617 B2
(45) Date of Patent: Jul. 20, 2010

(54) METHOD AND STRUCTURE OF CONFIGURING PREAMBLE TO SUPPORT TRANSMISSION OF DATA SYMBOL IN A WIRELESS COMMUNICATION SYSTEM

(75) Inventors: Young Cheul Yoon, San Diego, CA (US); Li-Hsiang Sun, San Diego, CA (US); Sang Gook Kim, San Diego, CA (US); Shu Wang, San Diego, CA (US); Ho Bin Kim, San Diego, CA (US); Suk Woo Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 509 days.

(21) Appl. No.: 11/691,399

(22) Filed: Mar. 26, 2007

(65) Prior Publication Data

US 2007/0268975 A1 Nov. 22, 2007

Related U.S. Application Data

(60) Provisional application No. 60/785,420, filed on Mar. 24, 2006.

(51) Int. Cl.
*H04J 11/00* (2006.01)
(52) U.S. Cl. .................. 370/208; 370/203; 375/260; 375/267
(58) Field of Classification Search ............... 370/203, 370/208, 210, 331, 338, 468; 375/260, 267; 455/63.1, 450, 562.1
See application file for complete search history.

(56) References Cited

U.S. PATENT DOCUMENTS

| | | | |
|---|---|---|---|
| 2001/0009555 A1* | 7/2001 | Diepstraten et al. | 370/468 |
| 2002/0041635 A1* | 4/2002 | Ma et al. | 375/267 |
| 2002/0150168 A1 | 10/2002 | Crawford | |
| 2004/0042385 A1 | 3/2004 | Kim et al. | |
| 2004/0066773 A1 | 4/2004 | Sun et al. | |
| 2004/0151146 A1* | 8/2004 | Hammerschmidt | 370/338 |
| 2004/0192208 A1* | 9/2004 | Kong et al. | 455/63.1 |
| 2005/0041574 A1* | 2/2005 | Wu et al. | 370/208 |
| 2006/0239227 A1* | 10/2006 | Han et al. | 370/331 |
| 2007/0066362 A1* | 3/2007 | Ma et al. | 455/562.1 |
| 2007/0070928 A1* | 3/2007 | Sutivong et al. | 370/310 |
| 2007/0195899 A1* | 8/2007 | Bhushan et al. | 375/260 |
| 2008/0039107 A1* | 2/2008 | Ma et al. | 455/450 |

FOREIGN PATENT DOCUMENTS

| | | |
|---|---|---|
| EP | 1241824 A1 | 9/2002 |
| EP | 1601118 A2 | 11/2005 |

* cited by examiner

*Primary Examiner*—Ricky Ngo
*Assistant Examiner*—Rasheed Gidado
(74) *Attorney, Agent, or Firm*—Lee, Hong, Degerman, Kang & Waimey

(57) ABSTRACT

A method of configuring a data packet including an orthogonal frequency division multiplexing (OFDM) preamble in a wireless communication system is disclosed. The method includes configuring the data packet to include the OFDM preamble in a first region, a pilot and medium access control (MAC) in a second region, and a data symbol in a third region.

14 Claims, 27 Drawing Sheets

CDMA SPREADING AND DESPREADING

CDMA SPREADING AND DESPREADING USING MULTIPLE SPREADING SEQUENCES

CDMA 2000 CALL PROCESSING OVERVIEW

CDMA 2000 INITIALIZATION STATE

SYSTEM ACCESS STATE

FIG. 9
COMPARISON OF CDMA2000 FOR 1x AND 1xEV-DO
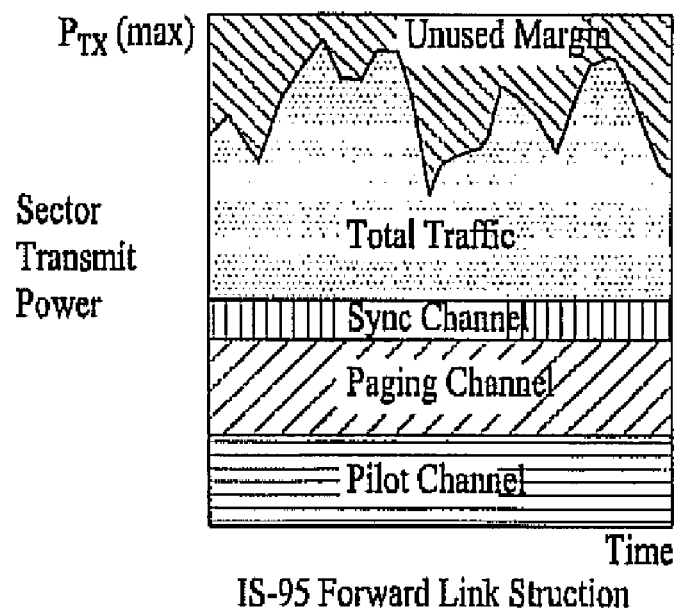
IS-95 Forward Link Struction
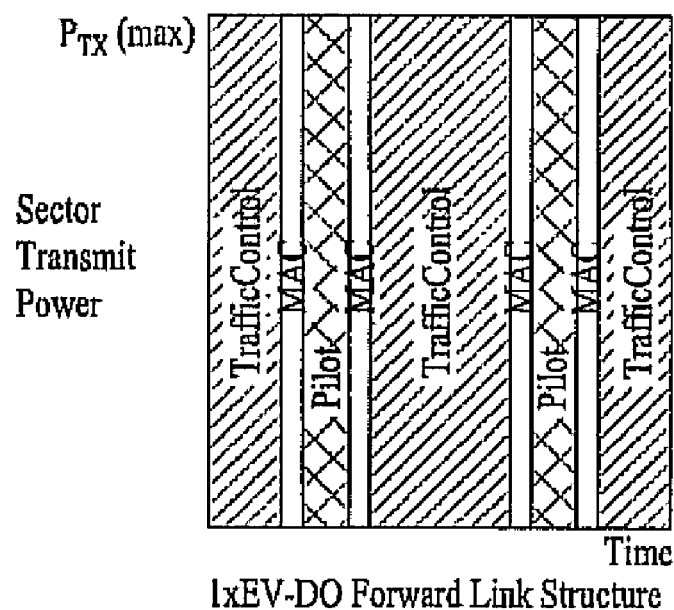
1xEV-DO Forward Link Structure 1xEV-DO NETWORK ARCHITECTURE 1xEV-DO DEFAULT PROTOCOL 1xEV-DO NON-DEFAULT PROTOCOL 1xEV-DO CONNECTION LAYER PROTOCOLS FIG. 16
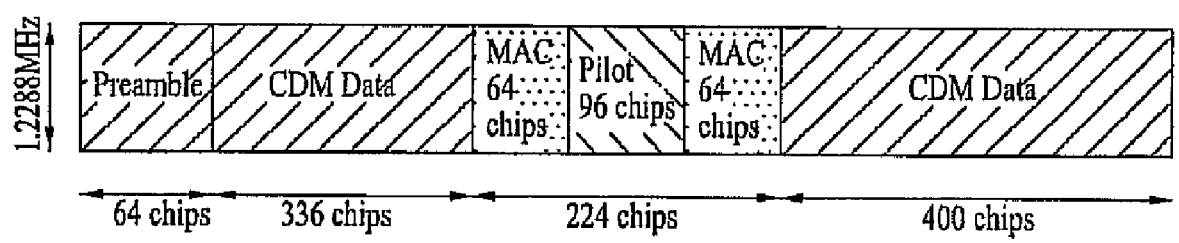
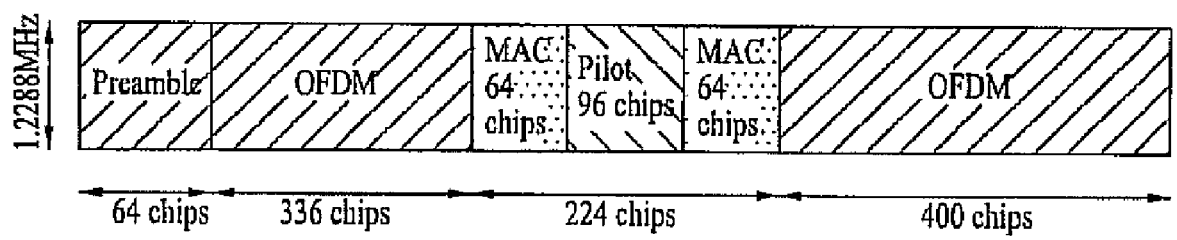

METHOD AND STRUCTURE OF CONFIGURING PREAMBLE TO SUPPORT TRANSMISSION OF DATA SYMBOL IN A WIRELESS COMMUNICATION SYSTEM

This application claims the benefit of U.S. Provisional Application No. 60/785,420 filed on Mar. 24, 2006.

BACKGROUND OF THE INVENTION

1. Field of the Invention

The present invention relates to a method and structure of configuring preamble, and more particularly, to a method and structure of configuring preamble to support transmission of data symbol in a wireless communication system.

2. Discussion of the Related Art

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G refers to the analog phone system, known as an AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G commonly refers to the digital cellular systems currently being deployed. These 3 G communication systems are conceptually similar to each other with some significant differences.

Associated with 3G systems is evolution data optimized (EV-DO) system. In cdma2000 1xEV-DO systems, a preamble sequence is transmitted with each Forward Traffic Channel and Control Channel physical layer packet in order to assist the access terminal with synchronization of each variable-rate transmission. The preamble consists of all '0' symbols transmitted on the in-phase component only.

FIG. 1 illustrates a preamble which is time multiplexed into a Forward Traffic Channel stream. In FIG. 1, the preamble length "N" is 64 chips, 128 chips, or 256 chips. FIG. 2 illustrates another preamble time multiplexed into a Forward Traffic Channel stream. Here, the preamble length is 512 chips or 1024 chips.

The preamble sequence is covered by a 64-chip bi-orthogonal sequence and the sequence is repeated 1 to 16 times depending on the transmit mode (e.g., 64, 128, 256, 512, or 1024 chips). The bi-orthogonal sequence is specified in terms of the 64-ary Walsh functions and their bit-by-bit complements by $W_{i/2}^{64}$ for i=0, 2, ... 126

$\overline{W_{(i-1)/2}^{64}}$ for i=1, 3, ..., 127 where i=0, 1, ..., 127 is the MACIndex value and $\overline{W_i^{64}}$ is the bit-by-bit complement of the 64-chip Walsh function of order i.

SUMMARY OF THE INVENTION

Accordingly, the present invention is directed to a method and structure of configuring preamble to support transmission of data symbol in a wireless communication system that substantially obviates one or more problems due to limitations and disadvantages of the related art.

An object of the present invention is to provide a method of configuring a data packet including an orthogonal frequency division multiplexing (OFDM) preamble in a wireless communication system.

Another object of the present invention is to provide a method of configuring a data packet in a multi-carrier wireless communication system.

A further object of the present invention is to provide a structure of a data packet including an orthogonal frequency division multiplexing (OFDM) preamble in a wireless communication system.

Yet, another aspect of the present invention is to provide a structure of a data packet in a multi-carrier wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of configuring a data packet including an orthogonal frequency division multiplexing (OFDM) preamble in a wireless communication system includes configuring the data packet to include the OFDM preamble in a first region, a pilot and medium access control (MAC) in a second region, and a data symbol in a third region.

In another aspect of the present invention, a method of configuring a data packet in a multi-carrier wireless communication system includes configuring the data packet, having at least two sub-bands, to include a preamble in a first region, a pilot and medium access control (MAC) in a second region, and a data symbol in a third region on each sub-band, wherein the preamble is allocated according to at least one prescribed allocation scheme per each sub-band.

In a further aspect of the present invention, a structure of a data packet including an orthogonal frequency division multiplexing (OFDM) preamble in a wireless communication system includes the OFDM preamble in a first region, a pilot and medium access control (MAC) in a second region, and a data symbol in a third region.

Yet, in another aspect of the present invention, a structure of a data packet in a multi-carrier wireless communication system includes a preamble in a first region, a pilot and medium access control (MAC) in a second region, and a data symbol in a third region, wherein the first region, the second region, and the third region each have same number of at least two sub-bands and wherein the preamble is allocated according to at least one prescribed allocation scheme per each sub-band.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

FIG. 5 illustrates the cdma2000 system access state;

FIG. 9 illustrates a comparison of cdma2000 for a 1x system and a 1xEV-DO system;

FIG. 16 is an exemplary diagram of carriers for CDM data and OFDM symbol;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
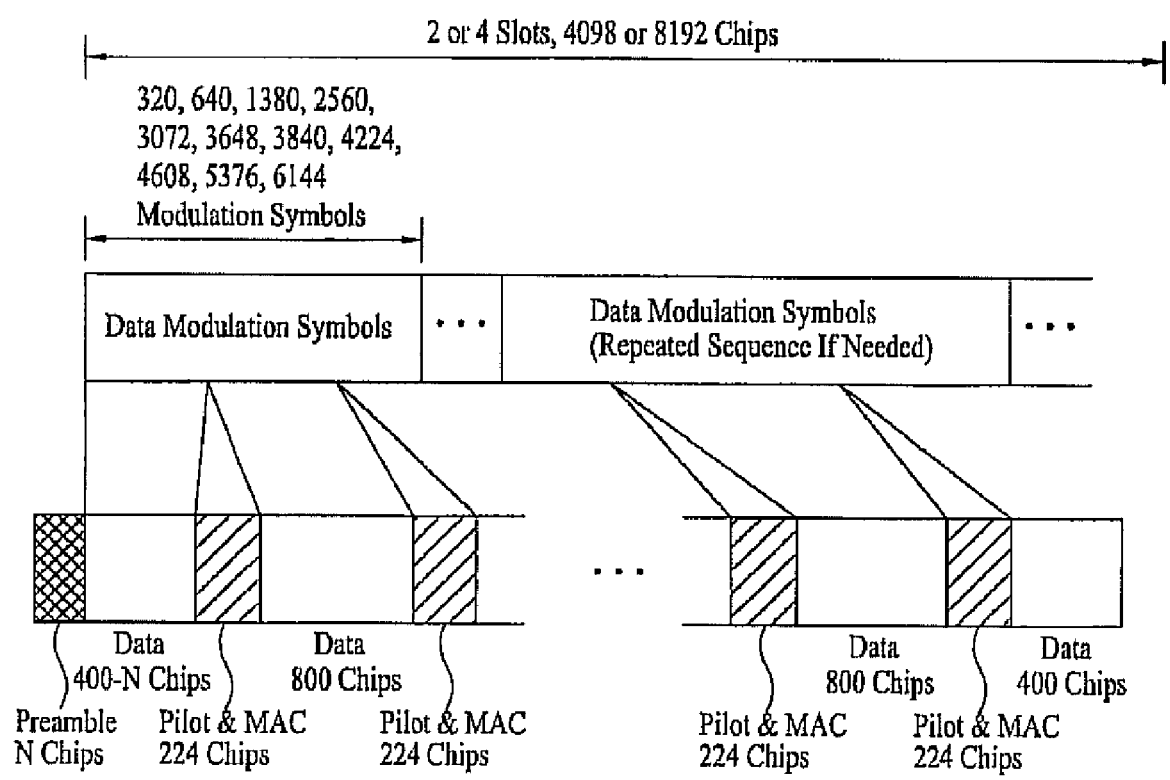
FIG. 1 illustrates a preamble which is time multiplexed into a Forward Traffic Channel stream.
Figure 2:
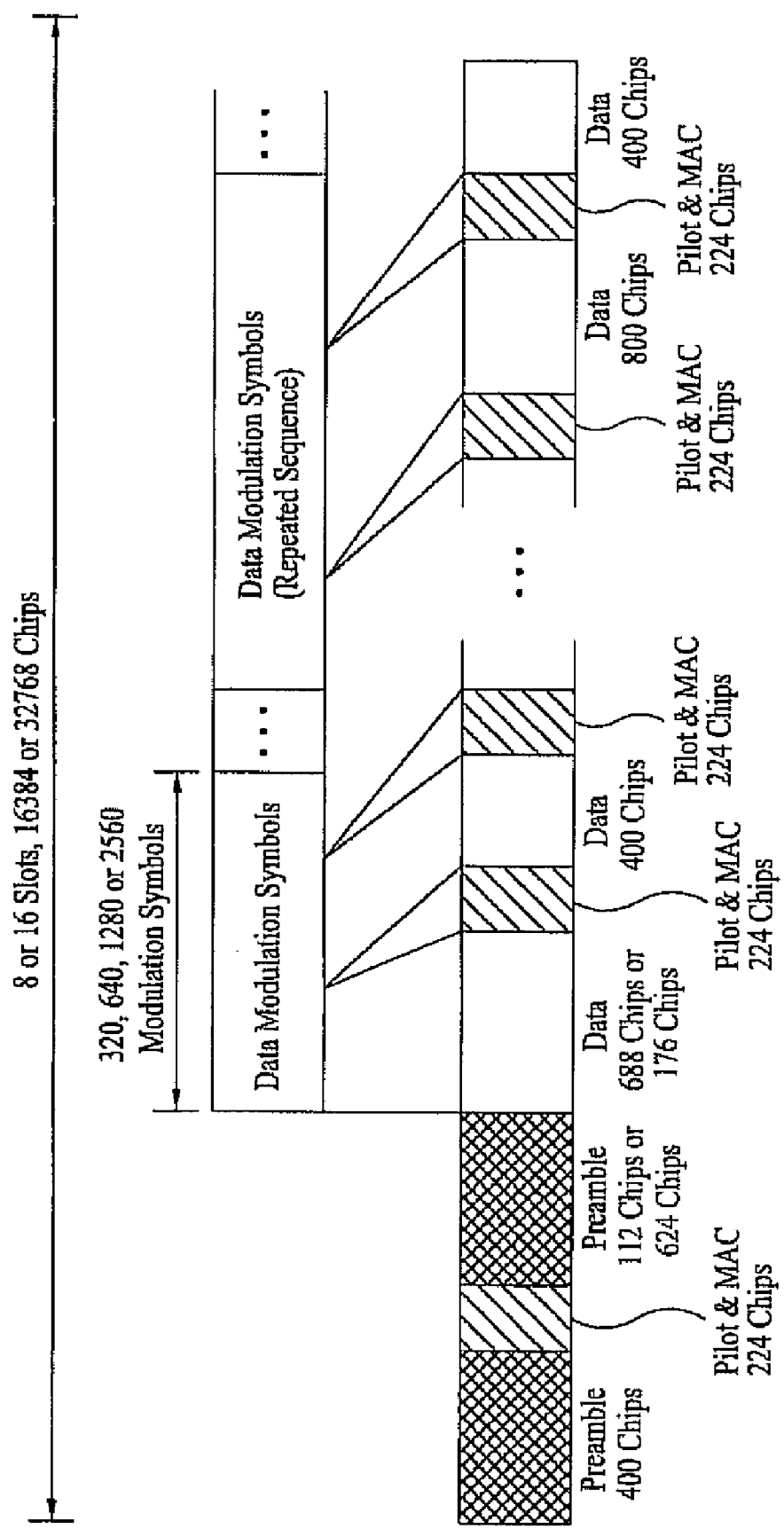
FIG. 2 illustrates another preamble time multiplexed into a Forward Traffic Channel stream.
Figure 3:
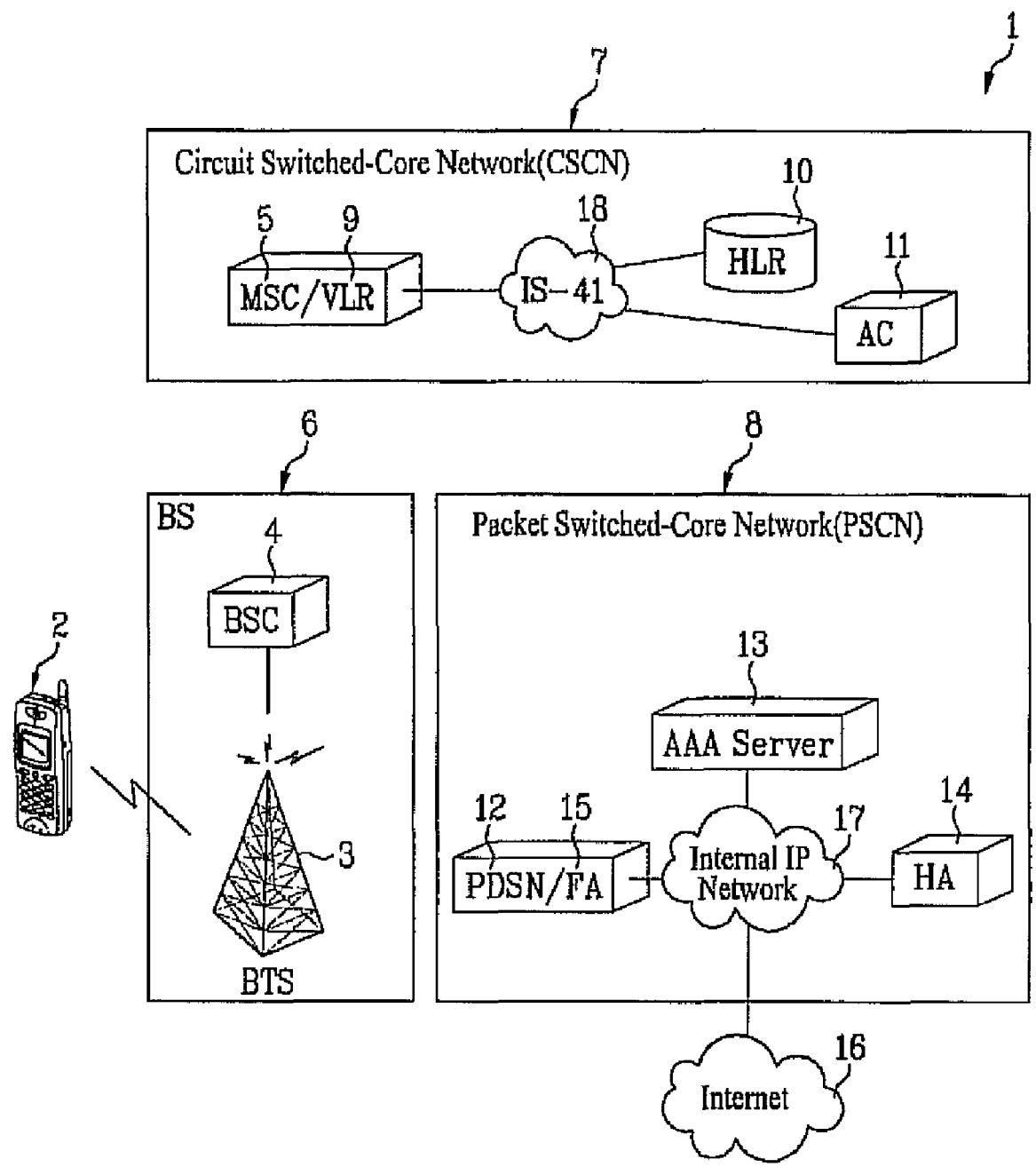
FIG. 3 illustrates wireless communication network architecture.

Referring to FIG. 3, a wireless communication network architecture is illustrated. A subscriber uses a mobile station (MS) 2 to access network services. The MS 2 may be a portable communications unit such as a hand-held cellular phone, a communication unit installed in a vehicle, or a fixed-location communications unit.

The electromagnetic waves for the MS 2 are transmitted by the Base Transceiver System (BTS) 3 also known as node B. The BTS 3 consists of radio devices such as antennas and equipment for transmitting and receiving radio waves. The BS 6 Controller (BSC) 4 receives the transmissions from one or more BTS's. The BSC 4 provides control and management of the radio transmissions from each BTS 3 by exchanging messages with the BTS and the Mobile Switching Center (MSC) 5 or Internal IP Network. The BTS's 3 and BSC 4 are part of the BS 6 (BS) 6.

The BS 6 exchanges messages with and transmits data to a Circuit Switched Core Network (CSCN) 7 and Packet Switched Core Network (PSCN) 8. The CSCN 7 provides traditional voice communications and the PSCN 8 provides Internet applications and multimedia services.

The Mobile Switching Center (MSC) 5 portion of the CSCN 7 provides switching for traditional voice communications to and from a MS 2 and may store information to support these capabilities. The MSC 2 may be connected to one of more BS's 6 as well as other public networks, for example a Public Switched Telephone Network (PSTN) (not shown) or Integrated Services Digital Network (ISDN) (not shown). A Visitor Location Register (VLR) 9 is used to retrieve information for handling voice communications to or from a visiting subscriber. The VLR 9 may be within the MSC 5 and may serve more than one MSC.

A user identity is assigned to the Home Location Register (HLR) 10 of the CSCN 7 for record purposes such as subscriber information, for example Electronic Serial Number (ESN), Mobile Directory Number (MDR), Profile Information, Current Location, and Authentication Period. The Authentication Center (AC) 11 manages authentication information related to the MS 2. The AC 11 may be within the HLR 10 and may serve more than one HLR. The interface between the MSC 5 and the HLR/AC 10, 11 is an IS-41 standard interface 18.

The Packet data Serving Node (PDSN) 12 portion of the PSCN 8 provides routing for packet data traffic to and from MS 2. The PDSN 12 establishes, maintains, and terminates link layer sessions to the MS 2's 2 and may interface with one of more BS 6 and one of more PSCN 8.

The Authentication, Authorization and Accounting (AAA) 13 Server provides Internet Protocol authentication, authorization and accounting functions related to packet data traffic. The Home Agent (HA) 14 provides authentication of MS 2 IP registrations, redirects packet data to and from the Foreign Agent (FA) 15 component of the PDSN 8, and receives provisioning information for users from the AAA 13. The HA 14 may also establish, maintain, and terminate secure communications to the PDSN 12 and assign a dynamic IP address.

The PDSN 12 communicates with the AAA 13, HA 14 and the Internet 16 via an Internal IP Network.

There are several types of multiple access schemes, specifically Frequency Division Multiple Access (FDMA), Time Division Multiple Access (TDMA) and Code Division Multiple Access (CDMA). In FDMA, user communications are separated by frequency, for example, by using 30 KHz channels. In TDMA, user communications are separated by frequency and time, for example, by using 30 KHz channels with 6 timeslots. In CDMA, user communications are separated by digital code.

In CDMA, All users on the same spectrum, for example, 1.25 MHz. Each user has a unique digital code identifier and the digital codes separate users to prevent interference.

A CDMA signal uses many chips to convey a single bit of information. Each user has a unique chip pattern, which is essentially a code channel. In order to recover a bit, a large number of chips are integrated according to a user's known chip pattern. Other user's code patterns appear random and are integrated in a self-canceling manner and, therefore, do not disturb the bit decoding decisions made according to the user's proper code pattern.

Figure 4A:
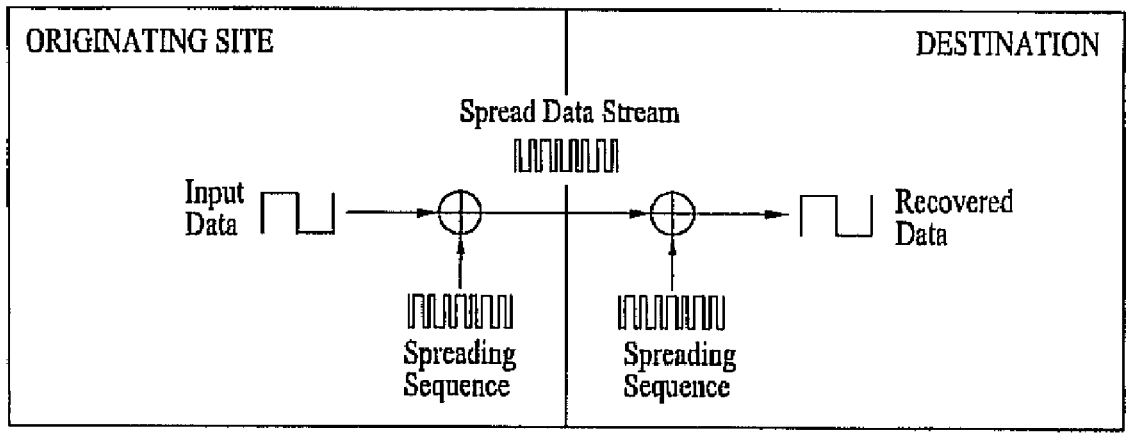
FIG. 4A illustrates a CDMA spreading and de-spreading process.
Figure 4B:
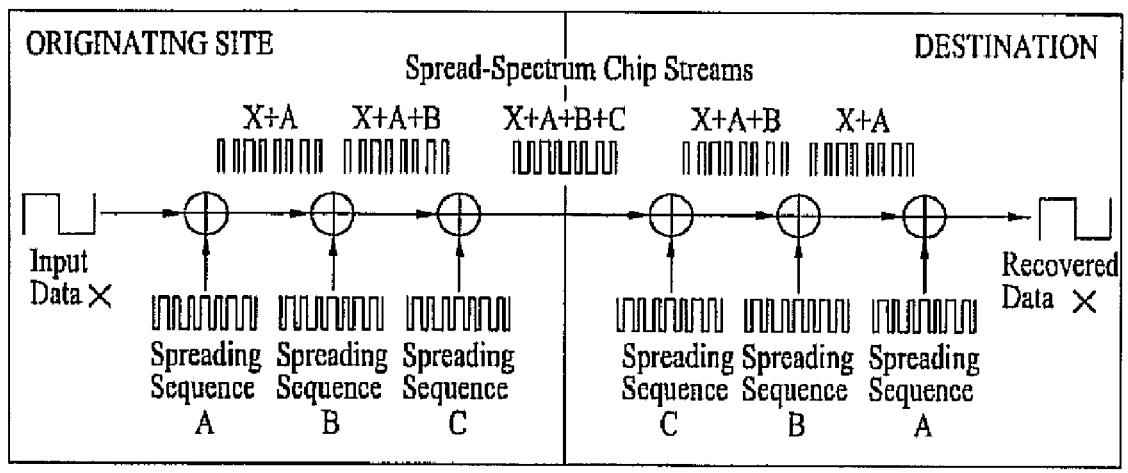
FIG. 4B illustrates a CDMA spreading and de-spreading process using multiple spreading sequences.

Input data is combined with a fast spreading sequence and transmitted as a spread data stream. A receiver uses the same spreading sequence to extract the original data. FIG. 4A illustrates the spreading and de-spreading process. As illustrated in FIG. 4B, multiple spreading sequences may be combined to create unique, robust channels.

A Walsh code is one type of spreading sequence. Each Walsh code is 64 chips long and is precisely orthogonal to all other Walsh codes. The codes are simple to generate and small enough to be stored in read only memory (ROM).

A short PN code is another type of spreading sequence. A short PN code consists of two PN sequences (I and Q), each of which is 32,768 chips long and is generated in similar, but differently tapped 15-bit shift registers. The two sequences scramble the information on the I and Q phase channels.

A long PN code is another type of spreading sequence. A long PN code is generated in a 42-bit register and is more than 40 days long, or about $4 \times 10^{13}$ chips long, Due to its length, a long PN code cannot be stored in ROM in a terminal and, therefore, is generated chip-by-chip.

Each MS 2 codes its signal with the PN long code and a unique offset, or public long code mask, computed using the long PN code ESN of 32-bits and 10 bits set by the system. The public long code mask produces a unique shift. Private long code masks may be used to enhance privacy. When integrated over as short a period as 64 chips, MS 2 with different long PN code offsets will appear practically orthogonal.

CDMA communication uses forward channels and reverse channels. A forward channel is utilized for signals from a BTS 3 to a MS 2 and a reverse channel is utilized for signals from a MS to a BTS.

A forward channel uses its specific assigned Walsh code and a specific PN offset for a sector, with one user able to have multiple channel types at the same time. A forward channel is identified by its CDMA RF carrier frequency, the unique short code PN offset of the sector and the unique Walsh code of the user. CDMA forward channels include a pilot channel, sync channel, paging channels and traffic channels.

The pilot channel is a "structural beacon" which does not contain a character stream, but rather is a timing sequence used for system acquisition and as a measurement device during handoffs. A pilot channel uses Walsh code 0.

The sync channel carries a data stream of system identification and parameter information used by MS 2 during system acquisition. A sync channel uses Walsh code 32.

There may be from one to seven paging channels according to capacity requirements. Paging channels carry pages, system parameter information and call setup orders. Paging channels use Walsh codes 1-7.

The traffic channels are assigned to individual users to carry call traffic. Traffic channels use any remaining Walsh codes subject to overall capacity as limited by noise.

A reverse channel is utilized for signals from a MS 2 to a BTS 3 and uses a Walsh code and offset of the long PN sequence specific to the MS, with one user able to transmit multiple types of channels simultaneously. A reverse channel is identified by its CDMA RF carrier frequency and the unique long code PN Offset of the individual MS 2. Reverse channels include traffic channels and access channels.

Individual users use traffic channels during actual calls to transmit traffic to the BTS 3. A reverse traffic channel is basically a user-specific public or private long code Mask and there are as many reverse traffic channels as there are CDMA terminals.

An MS 2 not yet involved in a call uses access channels to transmit registration requests, call setup requests, page responses, order responses and other signaling information. An access channel is basically a public long code offset unique to a BTS 3 sector. Access channels are paired with paging channels, with each paging channel having up to 32 access channels.

CDMA communication provides many advantages. Some of the advantages are variable rate vocoding and multiplexing, power control, use of RAKE receivers and soft handoff.

CDMA allows the use of variable rate vocoders to compress speech, reduce bit rate and greatly increase capacity. Variable rate vocoding provides full bit rate during speech, low data rates during speech pauses, increased capacity and natural sound. Multiplexing allows voice, signaling and user secondary data to be mixed in CDMA frames.

By utilizing forward power control, the BTS 3 continually reduces the strength of each user's forward baseband chip stream. When a particular MS 2 experiences errors on the forward link, more energy is requested and a quick boost of energy is supplied after which the energy is again reduced.

Using a RAKE receiver allows a MS 2 to use the combined outputs of the three traffic correlators, or "RAKE fingers," every frame. Each RAKE finger can independently recover a particular PN Offset and Walsh code. The fingers may be targeted on delayed multipath reflections of different BTS's 3, with a searcher continuously checking pilot signals.

The MS 2 drives soft handoff. The MS 2 continuously checks available pilot signals and reports to the BTS 3 regarding the pilot signals it currently sees. The BTS 3 assigns up to a maximum of six sectors and the MS 2 assigns its fingers accordingly. A1 messages are sent by dim-and-burst without muting. Each end of the communication link chooses the best configuration on a frame-by-frame basis, with handoff transparent to users.

A cdma2000 system is a third-generation (3G) wideband; spread spectrum radio interface system that uses the enhanced service potential of CDMA technology to facilitate data capabilities, such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

Figure 5:
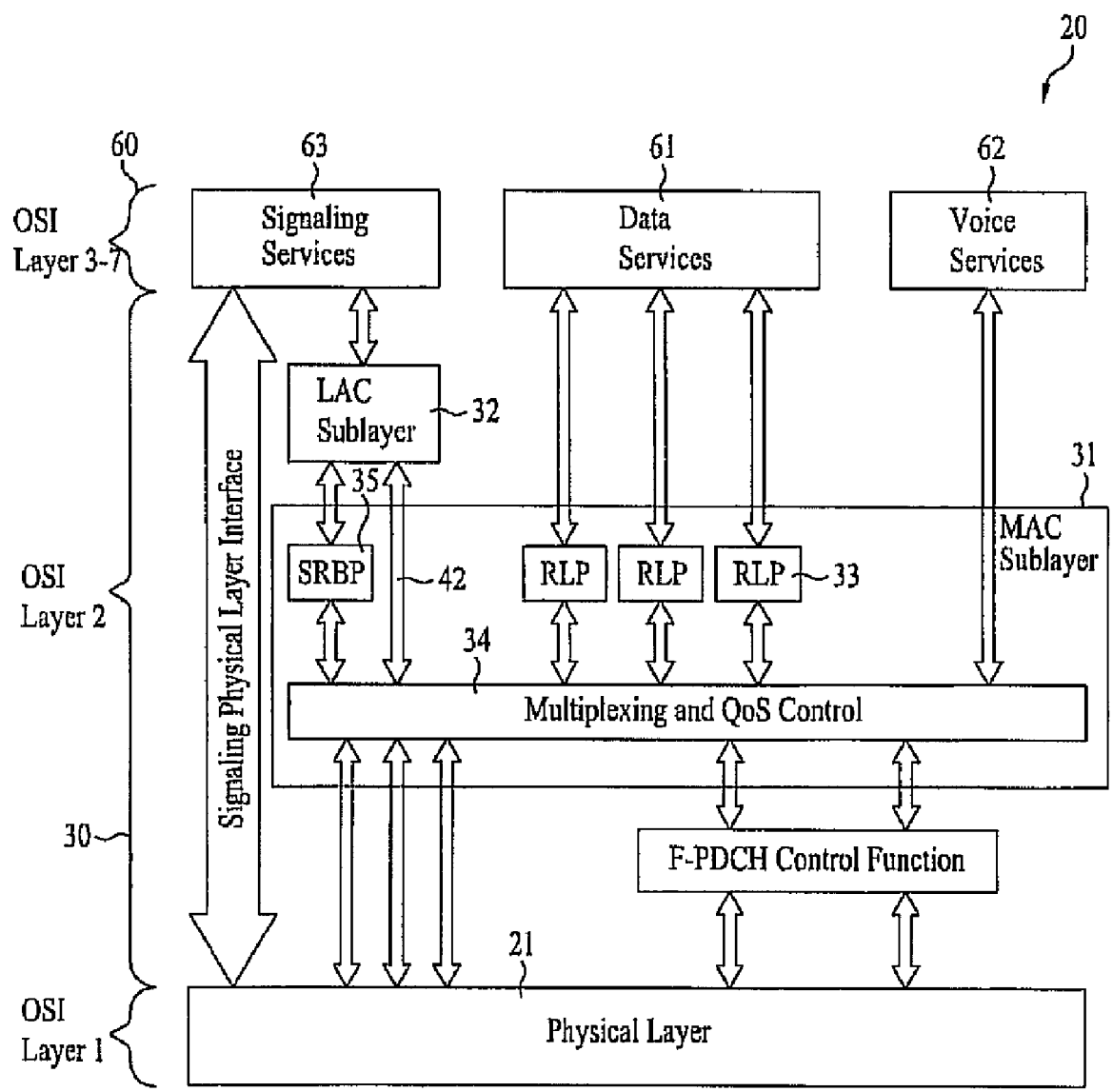
FIG. 5 illustrates a data link protocol architecture layer for a cdma2000 wireless network.

FIG. 5 illustrates a data link protocol architecture layer 20 for a cdma2000 wireless network. The data link protocol architecture layer 20 includes an Upper Layer 60, a Link Layer 30 and a Physical layer 21.

The Upper layer 60 includes three sublayers; a Data Services sublayer 61; a Voice Services sublayer 62 and a Signaling Services sublayer 63. Data services 61 are services that deliver any form of data on behalf of a mobile end user and include packet data applications such as IP service, circuit data applications such as asynchronous fax and B-ISDN emulation services, and SMS. Voice services 62 include PSTN access, mobile-to-mobile voice services, and Internet telephony. Signaling 63 controls all aspects of mobile operation.

The Signaling Services sublayer 63 processes all messages exchanged between the MS 2 and BS 6. These messages control such functions as call setup and teardown, handoffs, feature activation, system configuration, registration and authentication.

The Link Layer 30 is subdivided into the Link Access Control (LAC) sublayer 32 and the Medium Access Control (MAC) sublayer 31. The Link Layer 30 provides protocol support and control mechanisms for data transport services and performs the functions necessary to map the data transport needs of the Upper layer 60 into specific capabilities and characteristics of the Physical Layer 21. The Link Layer 30 may be viewed as an interface between the Upper Layer 60 and the Physical Layer 21.

The separation of MAC 31 and LAC 32 sublayers is motivated by the need to support a wide range of Upper Layer 60 services and the requirement to provide for high efficiency and low latency data services over a wide performance range, specifically from 1.2 Kbps to greater than 2 Mbps. Other motivators are the need for supporting high Quality of Service (QoS) delivery of circuit and packet data services, such as limitations on acceptable delays and/or data BER (bit error rate), and the growing demand for advanced multimedia services each service having a different QoS requirements.

The LAC sublayer 32 is required to provide a reliable, in-sequence delivery transmission control function over a point-to-point radio transmission link 42. The LAC sublayer 32 manages point-to point communication channels between upper layer 60 entities and provides framework to support a wide range of different end-to-end reliable Link Layer 30 protocols.

The Link Access Control (LAC) sublayer 32 provides correct delivery of signaling messages, Functions include assured delivery where acknowledgement is required, unassured delivery where no acknowledgement is required, duplicate message detection, address control to deliver a message to an individual MS 2, segmentation of messages into suitable sized fragments for transfer over the physical medium, reassembly and validation of received messages and global challenge authentication.

The MAC sublayer 31 facilitates complex multimedia, multi-services capabilities of 3G wireless systems with QoS management capabilities for each active service. The MAC sublayer 31 provides procedures for controlling the access of packet data and circuit data services to the Physical Layer 21, including the contention control between multiple services from a single user, as well as between competing users in the wireless system. The MAC sublayer 31 also performs mapping between logical channels and physical channels, multiplexes data from multiple sources onto single physical channels and provides for reasonably reliable transmission over the Radio Link Layer using a Radio Link Protocol (RLP) 33 for a best-effort level of reliability. Signaling Radio Burst Protocol (SRBP) 35 is an entity that provides connectionless protocol for signaling messages. Multiplexing and QoS Control 34 is responsible for enforcement of negotiated QoS levels by mediating conflicting requests from competing services and the appropriate prioritization of access requests.

The Physical Layer 21 is responsible for coding and modulation of data transmitted over the air. The Physical Layer 21 conditions digital data from the higher layers so that the data may be transmitted over a mobile radio channel reliably.

The Physical Layer 21 maps user data and signaling, which the MAC sublayer 31 delivers over multiple transport channels, into physical channels and transmits the information over the radio interface. In the transmit direction, the functions performed by the Physical Layer 21 include channel coding, interleaving, scrambling, spreading and modulation. In the receive direction, the functions are reversed in order to recover the transmitted data at the receiver.

Figure 6:
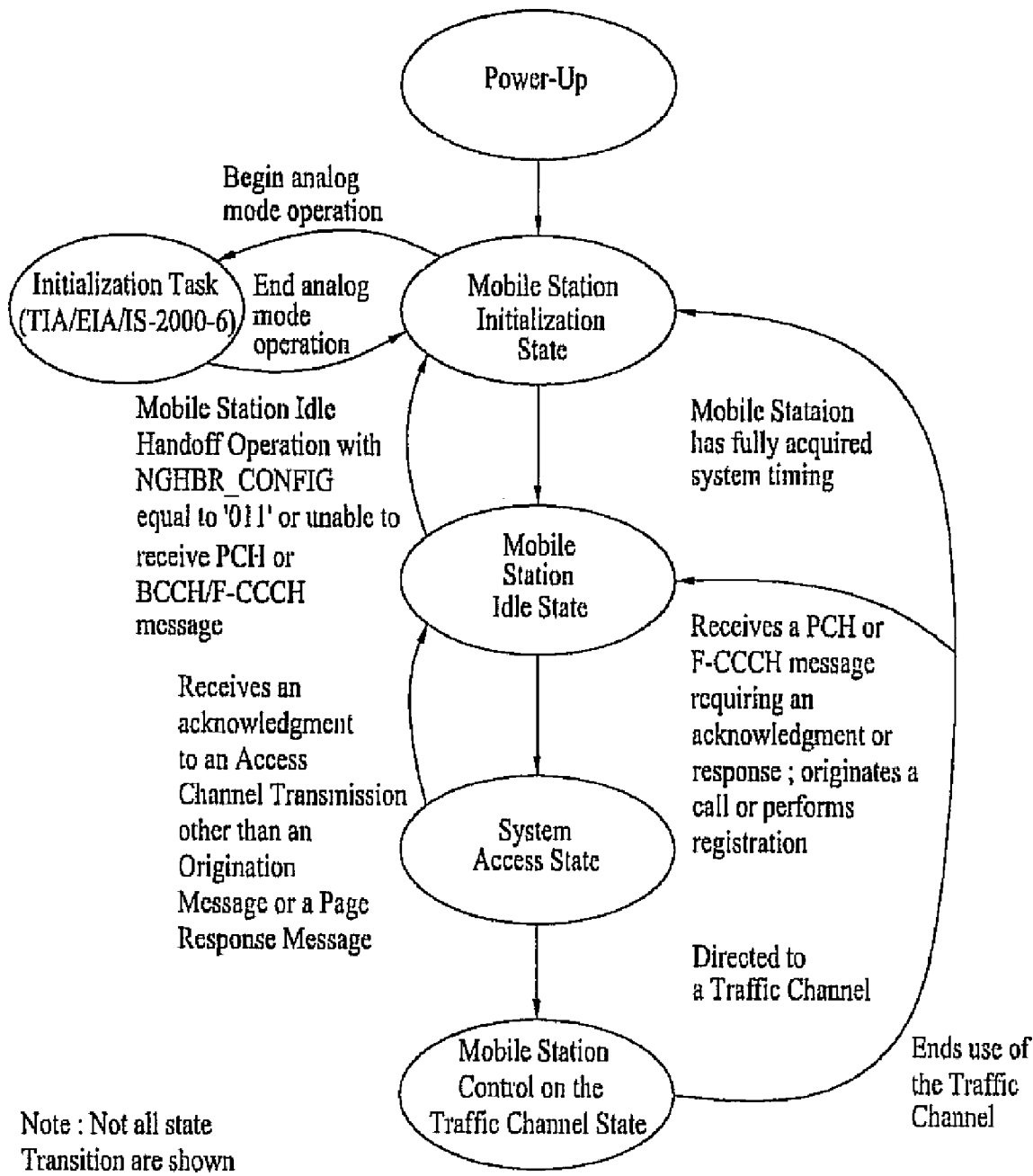
FIG. 6 illustrates cdma2000 call processing.

FIG. 6 illustrates an overview of call processing. Processing a call includes pilot and sync channel processing, paging channel processing, access channel processing and traffic channel processing.

Pilot and sync channel processing refers to the MS 2 processing the pilot and sync channels to acquire and synchronize with the CDMA system in the MS 2 Initialization State. Paging channel processing refers to the MS 2 monitoring the paging channel or the forward common control channel (F-CCCH) to receive overhead and mobile-directed messages from the BS 6 in the Idle State. Access channel processing refers to the MS 2 sending messages to the BS 6 on the access channel or the Enhanced access channel in the System Access State, with the BS 6 always listening to these channels and responding to the MS on either a paging channel or the F-CCCH. Traffic channel processing refers to the BS 6 and MS 2 communicating using dedicated forward and reverse traffic channels in the MS 2 Control on Traffic Channel State, with the dedicated forward and reverse traffic channels carrying user information, such as voice and data.

Figure 7:
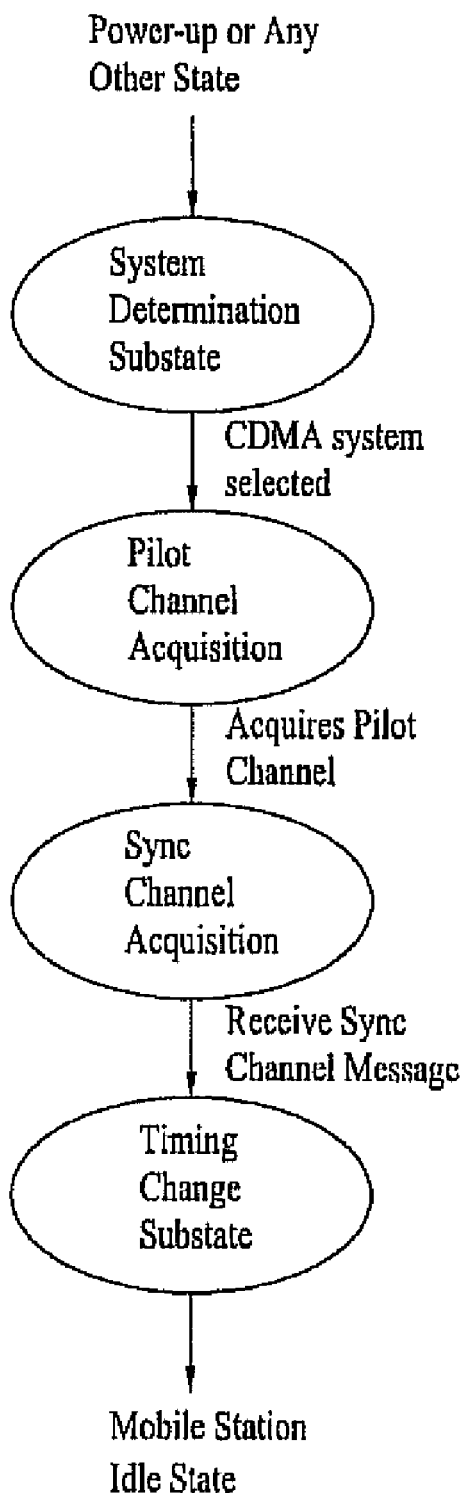
FIG. 7 illustrates the cdma2000 initialization state.

FIG. 7 illustrates the initialization state of a MS 2. The Initialization state includes a System Determination Substate, Pilot Channel Acquisition, Sync Channel Acquisition, a Timing Change Substate and a Mobile Station Idle State.

System Determination is a process by which the MS 2 decides from which system to obtain service. The process could include decisions such as analog versus digital, cellular versus PCS, and A carrier versus B carrier. A custom selection process may control System Determination. A service provider using a redirection process may also control System determination. After the MS 2 selects a system, it must determine on which channel within that system to search for service. Generally the MS 2 uses a prioritized channel list to select the channel.

Pilot Channel Processing is a process whereby the MS 2 first gains information regarding system timing by searching for usable pilot signals. Pilot channels contain no information, but the MS 2 can align its own timing by correlating with the pilot channel. Once this correlation is completed, the MS 2 is synchronized with the sync channel and can read a sync channel message to further refine its timing. The MS 2 is permitted to search up to 15 seconds on a single pilot channel before it declares failure and returns to System Determination to select either another channel or another system. The searching procedure is not standardized, with the time to acquire the system depending on implementation.

In cdma2000, there may be many pilot channels, such as OTD pilot, STS pilot and Auxiliary pilot, on a single channel. During System Acquisition, the MS 2 will not find any of these pilot channels because they are use different Walsh codes and the MS is only searching for Walsh 0.

The sync channel message is continuously transmitted on the sync channel and provides the MS 2 with the information to refine timing and read a paging channel. The mobile receives information from the BS 6 in the sync channel message that allows it to determine whether or not it will be able to communicate with that BS.

In the Idle State, the MS 2 receives one of the paging channels and processes the messages on that channel. Overhead or configuration messages are compared to stored sequence numbers to ensure the MS 2 has the most current parameters. Messages to the MS 2 are checked to determine the intended subscriber.

The BS 6 may support multiple paging channels and/or multiple CDMA channels (frequencies). The MS 2 uses a hash function based on its IMST to determine which channel and frequency to monitor in the Idle State. The BS 6 uses the same hash function to determine which channel and frequency to use when paging the MS 2.

Using a Slot Cycle Index (SCI) on the paging channel and on F-CCCH supports slotted paging. The main purpose of slotted paging is to conserve battery power in MS 2. Both the MS 2 and BS 6 agree in which slots the MS will be paged. The MS 2 can power down some of its processing circuitry during unassigned slots. Either the General Page message or the Universal Page message may be used to page the mobile on F-CCCH. A Quick paging channel that allows the MS 2 to power up for a shorter period of time than is possible using only slotted paging on F-PCH or F-CCCH is also supported.

Figure 8:
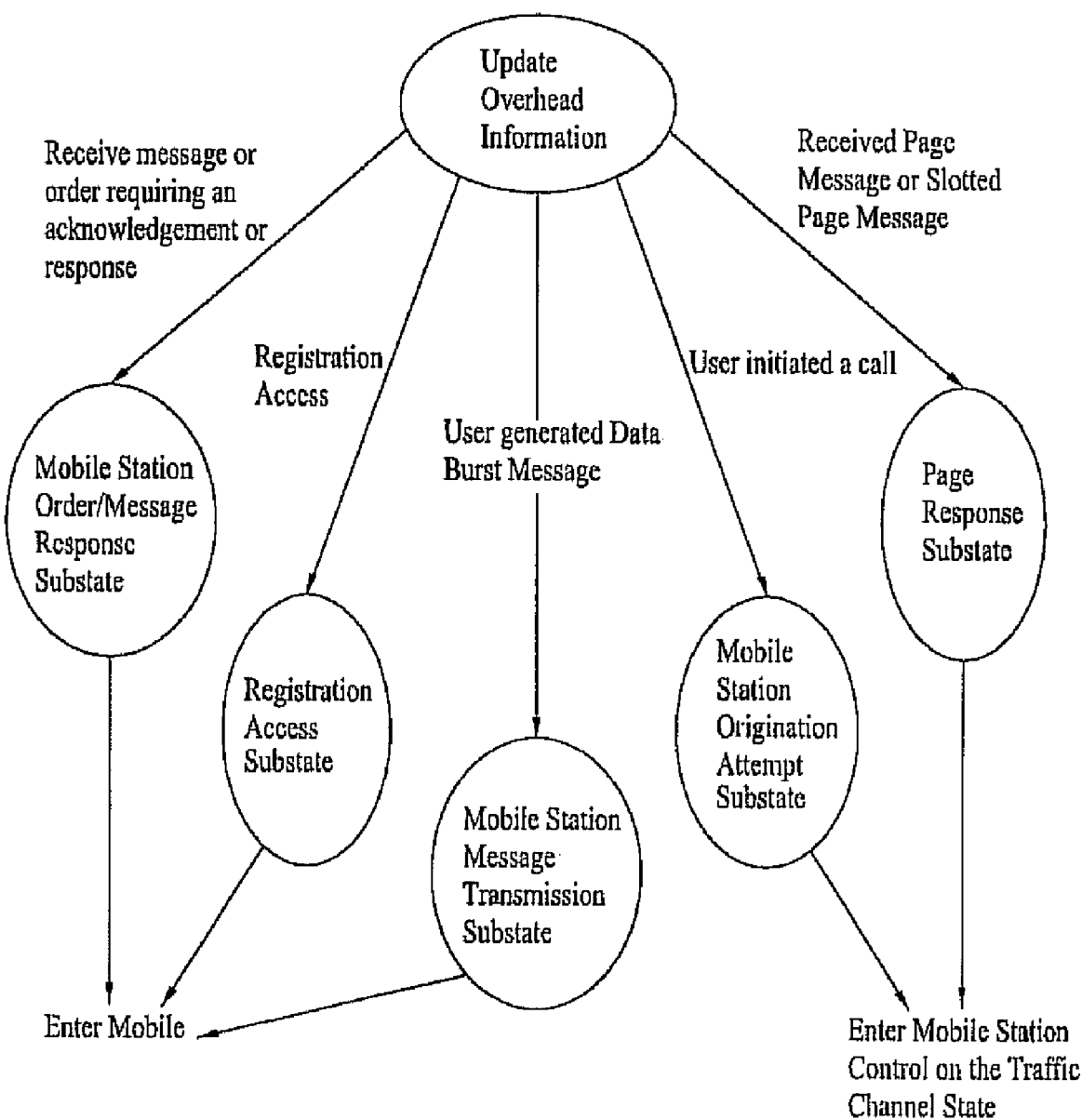

FIG. 8 illustrates the System Access state. The first step in the system access process is to update overhead information to ensure that the MS 2 is using the correct access channel parameters, such as initial power level and power step increments, A MS 2 randomly selects an access channel and transmits without coordination with the BS 6 or other MS. Such a random access procedure can result in collisions. Several steps can be taken to reduce the likelihood of collision, such as use of a slotted structure, use of a multiple access channel, transmitting at random start times and employing congestion control, for example, overload classes.

The MS 2 may send either a request or a response message on the access channel. A request is a message sent autonomously, such as an Origination message. A response is a message sent in response to a message received from the BS 6. For example, a Page Response message is a response to a General Page message or a Universal message.

The Multiplexing and QoS Control sublayer 34 has both a transmitting function and a receiving function. The transmitting function combines information from various sources, such as Data Services 61, Signaling Services 63 or Voice Services 62, and forms Physical layer SDUs and PDCHCF SDUs for transmission. The receiving function separates the information contained in Physical Layer 21 and PDCHCF SDUs and directs the information to the correct entity, such as Data Services 61, Upper Layer Signaling 63 or Voice Services 62.

The Multiplexing and QoS Control sublayer 34 operates in time synchronization with the Physical Layer 21. If the Physical Layer 21 is transmitting with a non-zero frame offset, the Multiplexing and QoS Control sublayer 34 delivers Physical Layer SDUs for transmission by the Physical Layer at the appropriate frame offset from system time.

The Multiplexing and QoS Control sublayer 34 delivers a Physical Layer 21 SDU to the Physical Layer using a physical-channel specific service interface set of primitives. The Physical Layer 21 delivers a Physical Layer SDU to the Multiplexing and QoS Control sublayer 34 using a physical channel specific Receive Indication service interface operation.

The SRBP Sublayer 35 includes the sync channel, forward common control channel, broadcast control channel, paging channel and access channel procedures.

The LAC Sublayer 32 provides services to Layer 3 60. SDUs are passed between Layer 3 60 and the LAC Sublayer 32. The LAC Sublayer 32 provides the proper encapsulation of the SDUs into LAC PDUs, which are subject to segmentation and reassembly and are transferred as encapsulated PDU fragments to the MAC Sublayer 31.

Processing within the LAC Sublayer 32 is done sequentially, with processing entities passing the partially formed LAC PDU to each other in a well-established order, SDUs and PDUs are processed and transferred along functional paths, without the need for the upper layers to be aware of the radio characteristics of the physical channels. However, the upper layers could be aware of the characteristics of the physical channels and may direct Layer 2 30 to use certain physical channels for the transmission of certain PDUs.

A 1xEV-DO system is optimized for packet data service and characterized by a single 1.25 MHz carrier ("1x") for data only or data Optimized ("DO"). Furthermore, there is a peak data rate of 2.4 Mbps or 3.072 Mbps on the forward Link and 153.6 Kbps or 1.8432 Mbps on the reverse Link. Moreover, a 1xEV-DO system provides separated frequency bands and internetworking with a 1x System. FIG. 9 illustrates a comparison of cdma2000 for a 1x system and a 1xEV-DO system.

In CDMA200, there are concurrent services, whereby voice and data are transmitted together at a maximum data rate of 614.4 kbps and 307.2 kbps in practice. An MS 2 communicates with the MSC 5 for voice calls and with the PDSN 12 for data calls. A cdma2000 system is characterized by a fixed rate with variable power with a Walsh-code separated forward traffic channel.

In a 1xEV-DO system, the maximum data rate is 2.4 Mbps or 3.072 Mbps and there is no communication with the circuit-switched core network 7. A 1xEV-DO system is characterized by fixed power and a variable rate with a single forward channel that is time division multiplexed.

Figure 10:
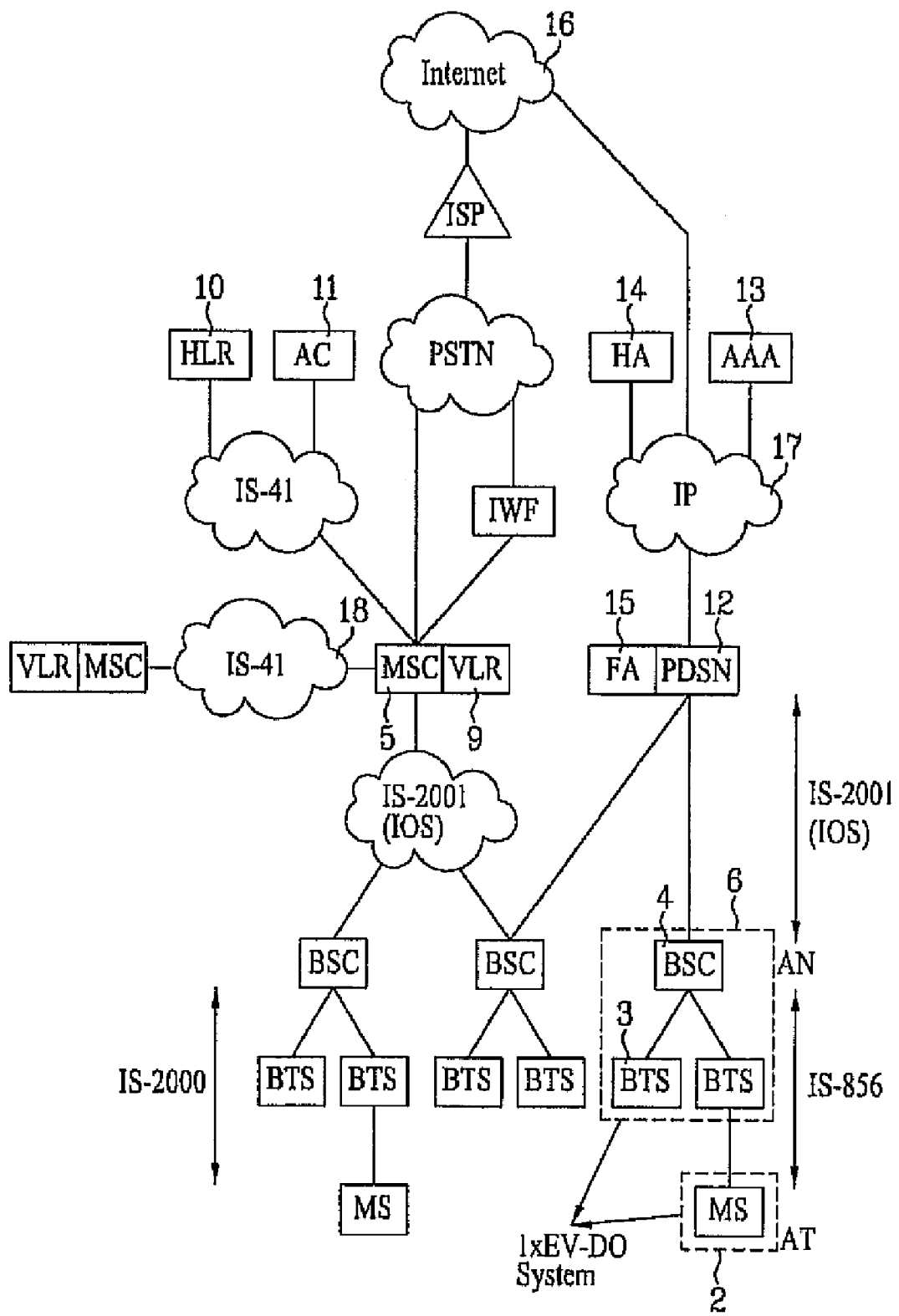
FIG. 10 illustrates a 1xEV-DO system architecture.
Figure 11:
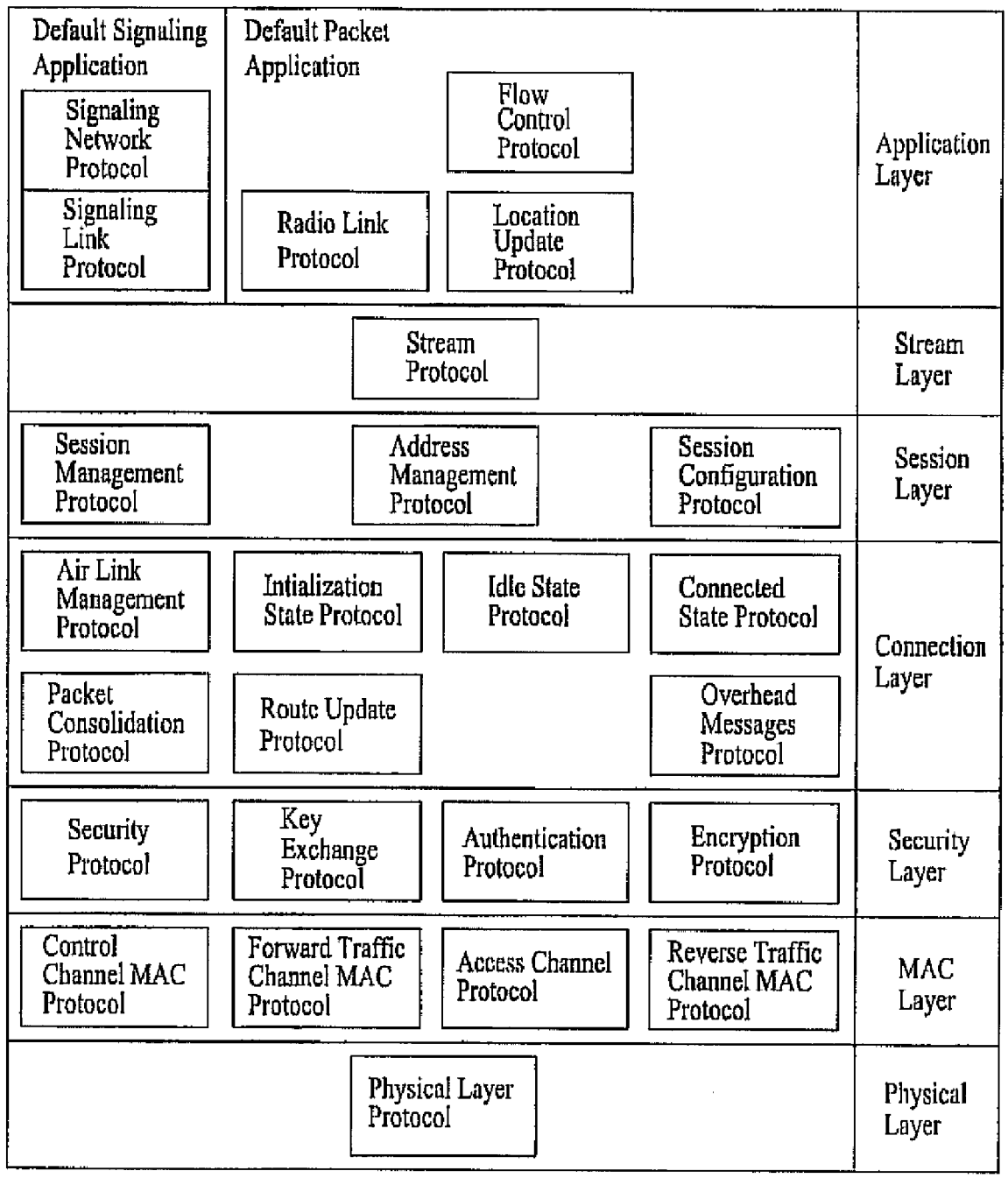
FIG. 11 illustrates 1xEV-DO default protocol architecture.

FIG. 10 illustrates a 1xEV-DO system architecture. In a 1xEV-DO system, a frame consists of 16 slots, with 600 slots/sec, and has a duration of 26.67 ms, or 32,768 chips. A single slot is 1.6667 ms long and has 2048 chips. A control/traffic channel has 1600 chips in a slot, a pilot channel has 192 chips in a slot and a MAC channel has 256 chips in a slot. A 1xEV-DO system facilitates simpler and faster channel estimation and time synchronization, FIG. 11 illustrates a 1xEV-DO default protocol architecture. FIG. 10 illustrates a 1xEV-DO non-default protocol architecture.

Information related to a session in a 1xEV-DO system includes a set of protocols used by an MS 2, or access terminal (AT), and a BS 6, or access network (AN), over an airlink, a Unicast Access Terminal Identifier (UATI), configuration of the protocols used by the AT and AN over the airlink and an estimate of the current AT location.

The Application Layer provides best effort, whereby the message is sent once, and reliable delivery, whereby the message can be retransmitted one or more times. The stream layer provides the ability to multiplex up to 4 (default) or 255 (non-default) application streams for one AT 2.

The Session Layer ensures the session is still valid and manages closing of session, specifies procedures for the initial UATI assignment, maintains AT addresses and negotiates/ provisions the protocols used during the session and the configuration parameters for these protocols.

Figure 12:
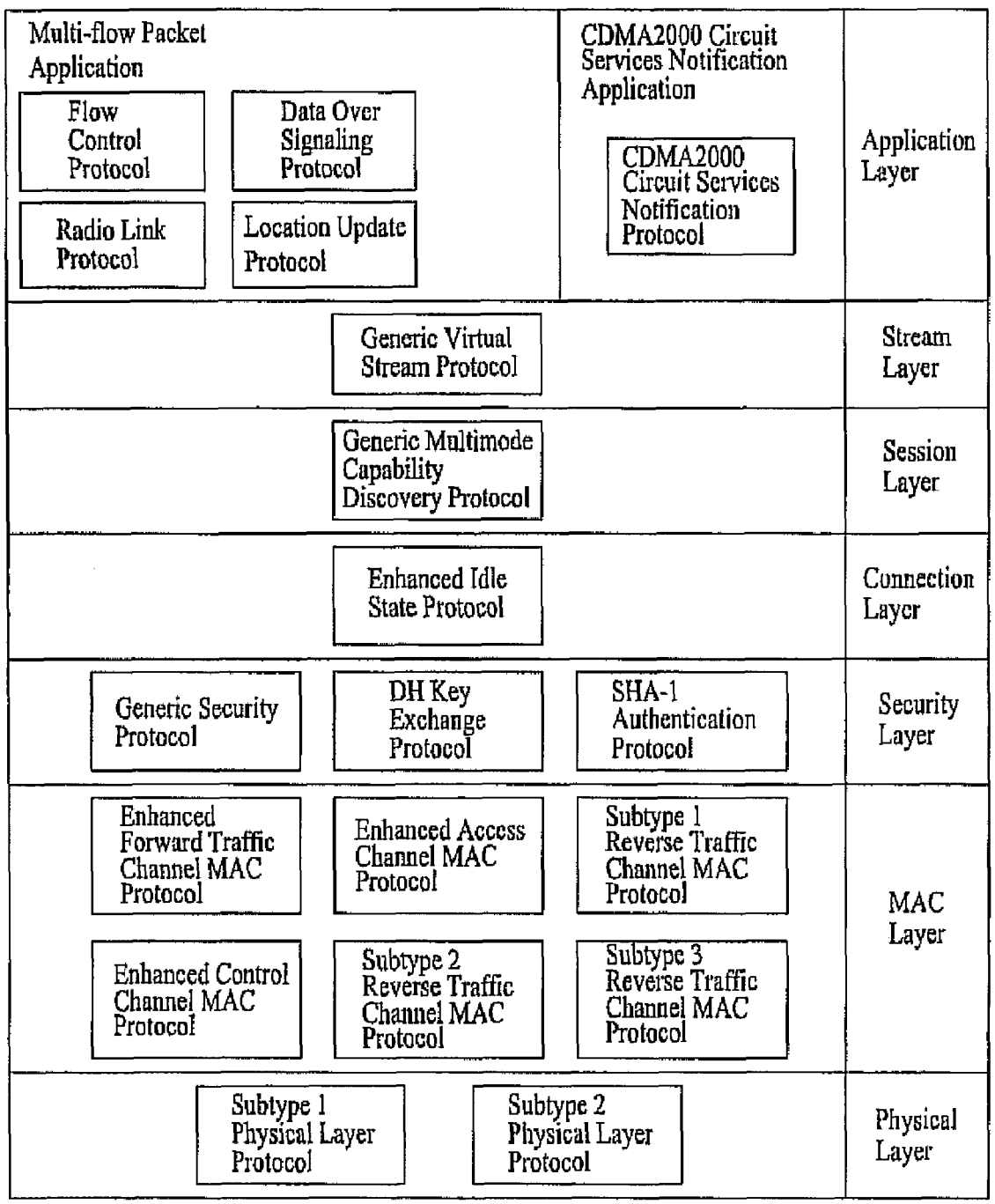
FIG. 12 illustrates 1xEV-DO non-default protocol architecture.
Figure 14:
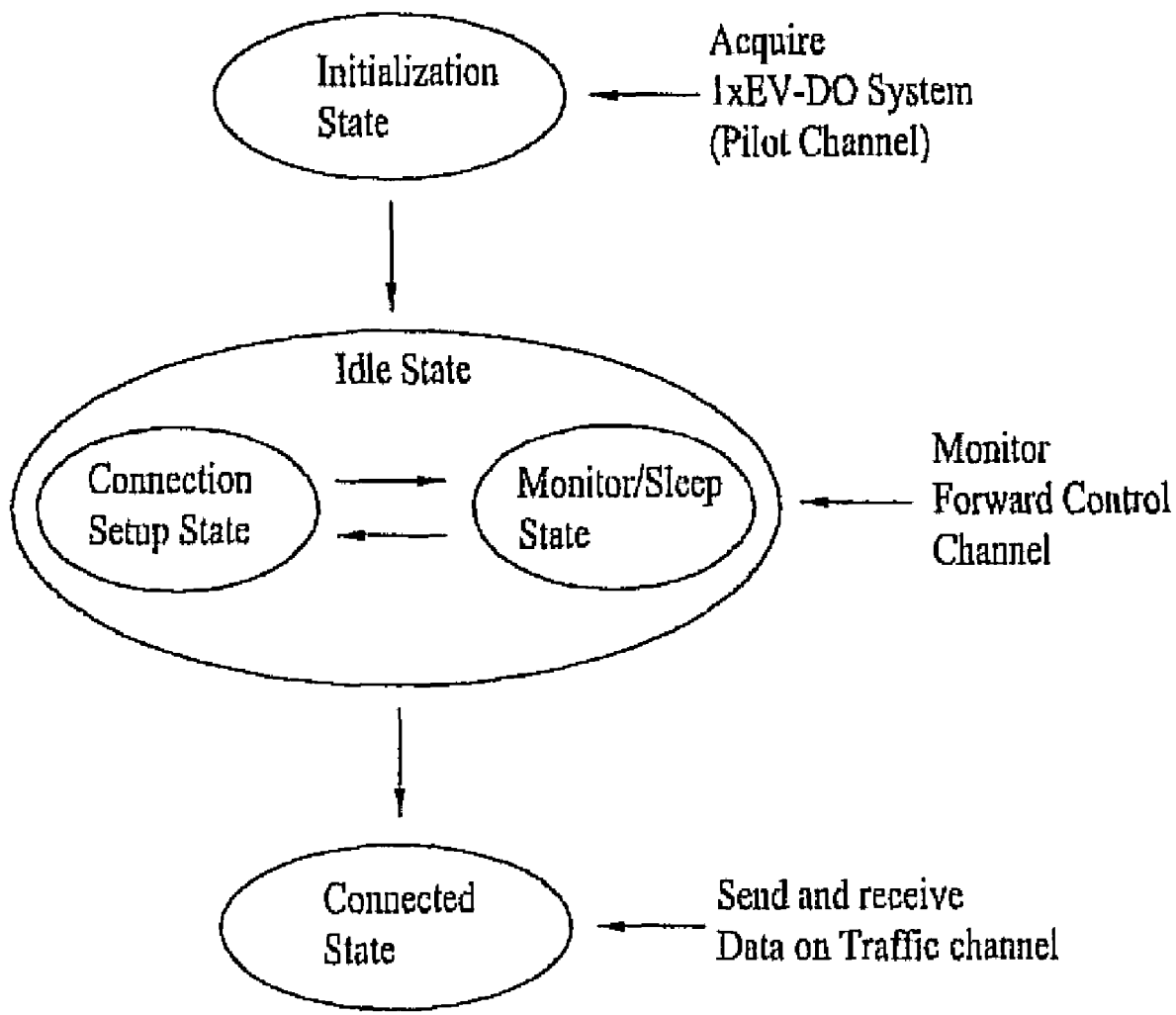
FIG. 14 illustrates 1xEV-DO connection layer protocols.

FIG. 12 illustrates the establishment of a 1xEV-DO session. As illustrated in FIG. 14, establishing a session includes address configuration, connection establishment, session configuration and exchange keys.

Address configuration refers to an Address Management protocol assigning a UATI and Subnet mask. Connection establishment refers to Connection Layer Protocols setting up a radio link. Session configuration refers to a Session Configuration Protocol configuring all protocols. Exchange key refers a Key Exchange protocol in the Security Layer setting up keys for authentication.

A "session' refers to the logical communication link between the AT 2 and the RNC, which remains open for hours, with a default of 54 hours. A session lasts until the PPP session is active as well. Session information is controlled and maintained by the RNC in the AN 6.

When a connection is opened, the AT 2 can be assigned the forward traffic channel and is assigned a reverse traffic channel and reverse power control channel. Multiple connections may occur during single session.

The Connection Layer manages initial acquisition of the network and communications. Furthermore, the Connection Layer maintains an approximate AT 2 location and manages a radio link between the AT 2 and the AN 6. Moreover, the Connection Layer performs supervision, prioritizes and encapsulates transmitted data received from the Session Layer, forwards the prioritized data to the Security Layer and decapsulates data received from the Security Layer and forwards it to the Session Layer.

Figure 13:
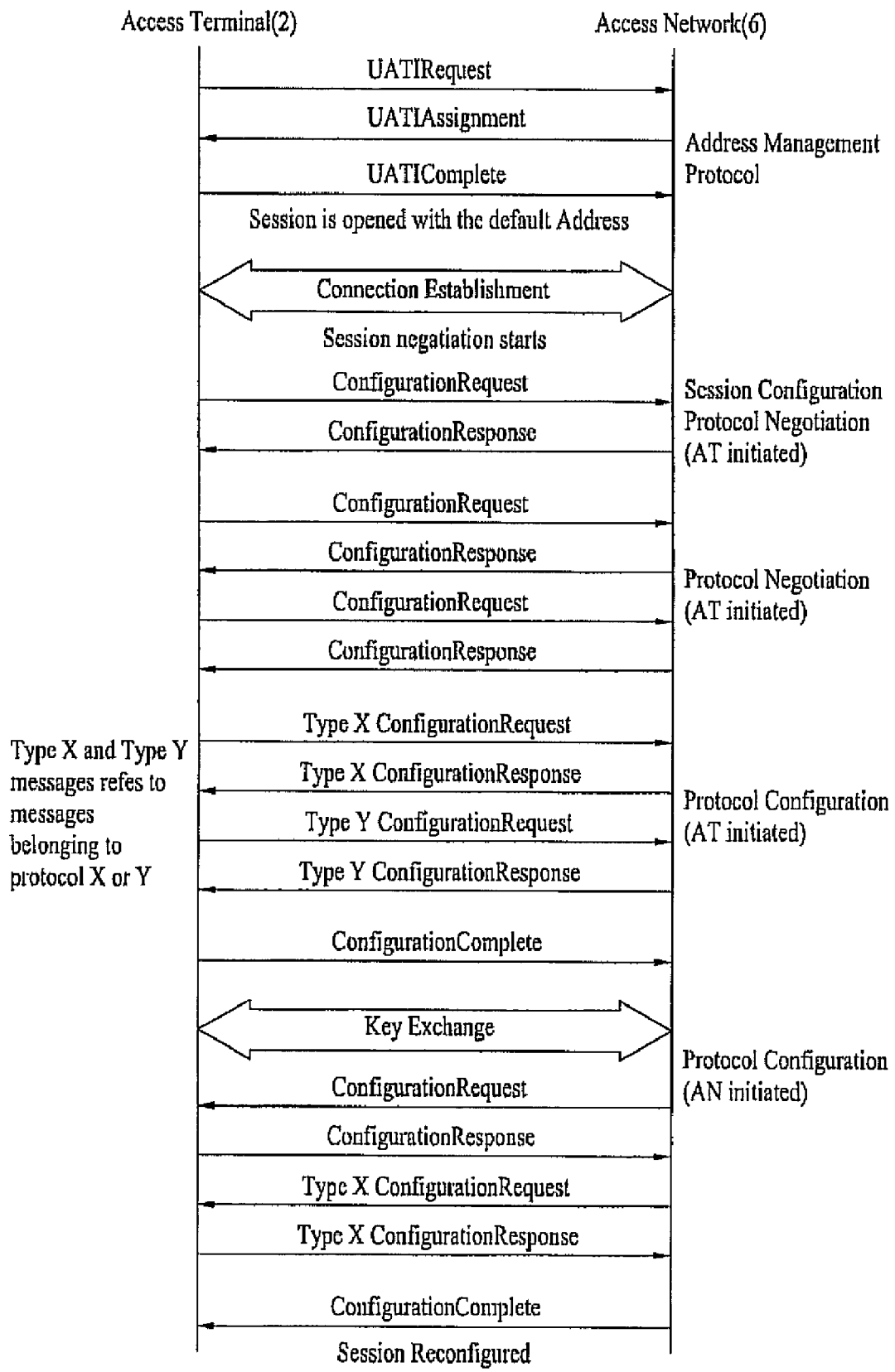
FIG. 13 illustrates 1xEV-DO session establishment.

FIG. 13 illustrates Connection Layer Protocols. As illustrated in FIG. 14, the protocols include an Initialization State, an Idle State and a Connected State.

In the Initialization State, the AT 2 acquires the AN 6 and activates the initialization State Protocol. In the Idle State, a closed connection is initiated and the Idle State Protocol is activated. In the Connected State, an open connection is initiated and the Connected State Protocol is activated.

A closed connection refers to a state where the AT 2 is not assigned any dedicated air-link resources and communications between the AT and AN 6 are conducted over the access channel and the control channel. An open connection refers to a state where the AT 2 can be assigned the forward traffic channel, is assigned a reverse power control channel and a reverse traffic channel and communication between the AT 2 and AN 6 is conducted over these assigned channels as well as over the control channel.

The Initialization State Protocol performs actions associated with acquiring an AN 6. The Idle State Protocol performs actions associated with an AT 2 that has acquired an AN 6, but does not have an open connection, such as keeping track of the AT location using a Route Update Protocol. The Connected State Protocol performs actions associated with an AT 2 that has an open connection, such as managing the radio link between the AT and AN 6 and managing the procedures leading to a closed connection. The Route Update Protocol performs actions associated with keeping track of the AT 2 location and maintaining the radio link between the AT and AN 6. The Overhead Message Protocol broadcasts essential parameters, such as QuickConfig, SectorParameters and AccessParameters message, over the control channel. The Packet Consolidation Protocol consolidates and prioritizes packets for transmission as a function of their assigned priority and the target channel as well as providing packet demultiplexing on the receiver.

The Security Layer includes a key exchange function, authentication function and encryption function. The key exchange function provides the procedures followed by the AN 2 and AT 6 for authenticating traffic. The authentication function provides the procedures followed by the AN 2 and AT 6 to exchange security keys for authentication and encryption. The encryption function provides the procedures followed by the AN 2 and AT 6 for encrypting traffic.

The 1xEV-DO forward Link is characterized in that no power control and no soft handoff is supported. The AN 6 transmits at constant power and the AT 2 requests variable rates on the Forward Link. Because different users may transmit at different times in TDM, it is difficult to implement diversity transmission from different BS's 6 that are intended for a single user.

In the MAC Layer, two types of messages originated from higher layers are transported across the physical layer, specifically a User data message and a signaling message. Two protocols are used to process the two types of messages, specifically a forward traffic channel MAC Protocol for the User data message and a control channel MAC Protocol, for the signaling message.

The Physical Layer is characterized by a spreading rate of 1.2288 Mcps, a frame consisting of 16 slots and 26.67 ms, with a slot of 1.67 ms and 2048 chips. The forward Link channel includes a pilot channel, a forward traffic channel or control channel and a MAC channel.

The pilot channel is similar to the cdma2000 pilot channel in that it comprises all "0" information bits and Walsh-spreading with W0 with 192 chips for a slot.

The forward traffic channel is characterized by a data rate that varies from 38.4 kbps to 2.4576 Mbps or from 4.8 kbps to 3.072 Mbps. Physical Layer packets can be transmitted in 1 to 16 slots and the transmit slots use 4-slot interlacing when more than one slot is allocated. If ACK is received on the reverse Link ACK channel before all of the allocated slots have been transmitted, the remaining slots shall not be transmitted.

The control channel is similar to the sync channel and paging channel in cdma2000. The control channel is characterized by a period of 256 slots or 427.52 ms, a Physical Layer packet length of 1024 bits or 128, 256, 512 and 1024 bits and a data rate of 38.4 kbps or 76.8 kbps or 19.2 kbps, 38.4 kbps or 76.8 kbps.

The 1xEV-DO reverse link is characterized in that the AN 6 can power control the reverse Link by using reverse power control and more than one AN can receive the AT's 2 transmission via soft handoff. Furthermore, there is no TDM on the reverse Link, which is channelized by Walsh code using a long PN code.

An access channel is used by the AT 2 to initiate communication with the AN 6 or to respond to an AT directed message. Access channels include a pilot channel and a data channel.

An AT 2 sends a series of access probes on the access channel until a response is received from the AN 6 or a timer expires. An access probe includes a preamble and one or more access channel Physical Layer packets. The basic data rate of the access channel is 9.6 kbps, with higher data rates of 19.2 kbps and 38.4 kbps available.

When more that one AT 2 is paged using the same Control channel packet, Access Probes may be transmitted at the same time and packet collisions are possible. The problem can be more serious when the ATs 2 are co-located, are in a group call or have similar propagation delays.

In data transmission, for example, the data is channel coded, interleaved, and modulated into symbols (which can also be referred to as coded or modulated data stream). The symbols are then demultiplexed to multiple encoder blocks (e.g., space-time encoder). Here, demultiplexing is based on the code rate and modulation that the carrier can support. Each encoder block (e.g., Alamouti encoder) encodes the symbols and outputs the encoded symbols to inverse fast Fourier transform (IFFT) block(s). The IFFT block transforms the encoded symbols. The transformed symbols are then assigned to antennas and through these antennas, the symbols are assigned to carriers and transmitted to the receiving end. Often, the transmission of the data or symbols can be referred to as transmission of, data packets, packets, and/or data symbols.

Figure 15:
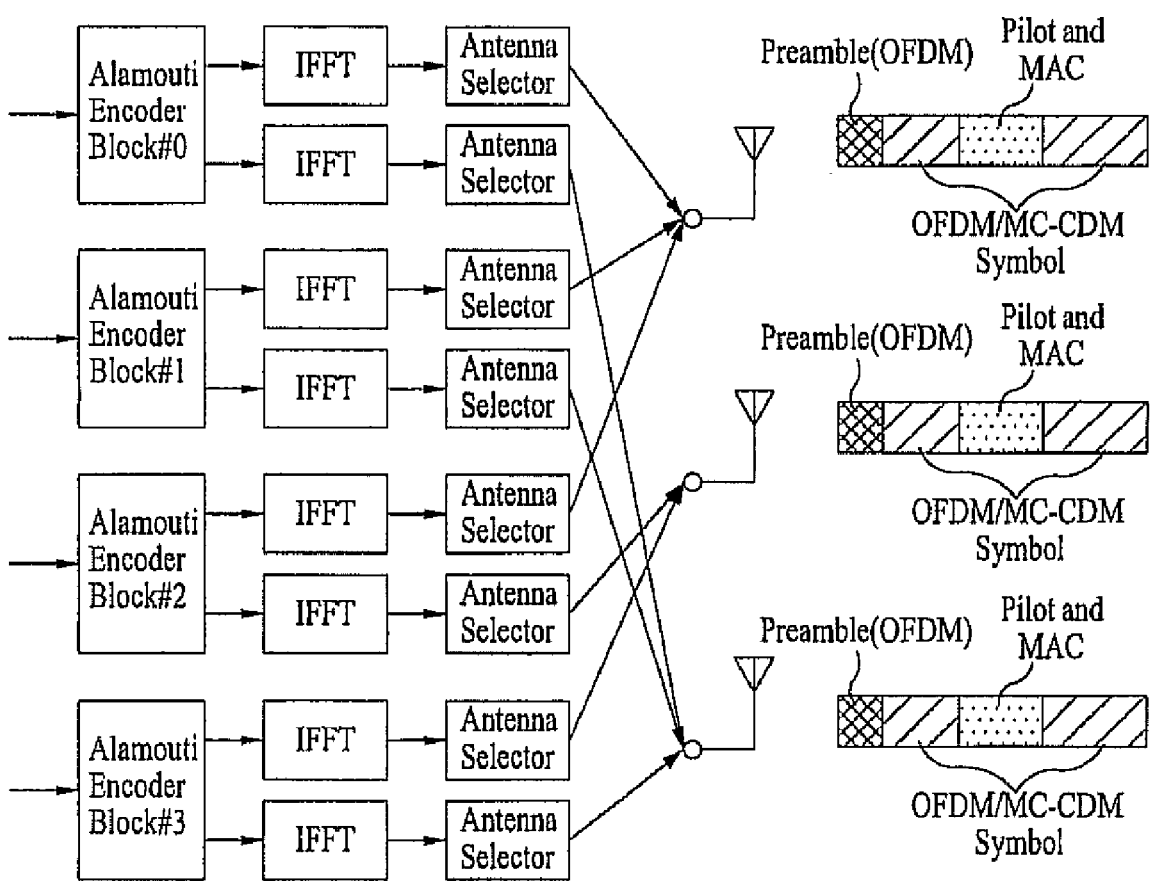
FIG. 15 is an exemplary diagram illustrating transmission of data in a wireless communication system.

FIG. 15 is an exemplary diagram illustrating transmission of data in a wireless communication system. The wireless communication system can be a single antenna system as well as a multi input, multi output (MIMO) antenna system. As discussed, the data can be transmitted via antennas to the receiving end. In the transmission, a preamble, overhead information (e.g., pilot and MAC), and data are included.

In the discussion to follow, a more detailed discussion of methods of configuring different types and forms of data packets/data symbols will be discussed as well as various structures related to different types and forms of configuring data packets/data symbols.

In the current data-only (DO) system, there is a time-division multiplexing (TDM)-wise preamble concept. Traditionally, a length of a preamble is multiple of 64 chips, ranging from 64 to 1024 chips, and the data portion can occupy up to 400 chips per sub-slot (or quarter slot).

Based on the lengths (or durations) of the preambles (e.g., 64 chips and multiples thereof, the entire sub-slot usually is not fully occupied by the preamble. Instead, there usually remains leftover chips within a sub-slot. For example, if the preamble length is 64 chips, then 336 chips are leftover or unused. Moreover, if the preamble duration is 128 chips, then 272 chips are leftover in the sub-slot (i.e., 400 chips). These unused or leftover chips can be used to transmit data. That is, the remaining chips can be used for code division multiplexing (CDM) data or orthogonal frequency division multiplexing (OFDM) data transmission to deliver data traffic.

If the TDM-wise preamble is used in OFDM, then various fast Fourier transform (FFT) sizes may be required since the duration of OFDM symbol, consisting of remaining chips, may not be the same as original OFDM symbol duration.

FIG. 16 is an exemplary diagram of carriers for CDM data and OFDM symbol. In FIG. 16, the CDM data or the OFDM symbol is placed immediately after the preamble. Here, the preamble length is 64 chips, and the residual chips are 336 chips (400 chips−64 chips=336 chips) which are used for carrying CDM data or OFDM symbol. In this case, both 336 chips and 400 chips of FFT size may be needed for OFDM symbol duration.

If there are many other preamble lengths (e.g., 128 chips, 256 chips, 512 chips, or 1024 chips), additional variety of FFT size may be necessary. Consequently, with addition of multiple FFT sizes, transmission and reception can become more complex.

To address problems associated with more complex transmission and reception due to multiple FFT sizes, the design of the transmission slot can be changed. More specifically, the preambles can be designed differently, First, a preamble can be designed to support OFDM/multi-carrier code division multiple access (MC-CDMA) access terminal (AT). That is, preamble chips can be mapped to OFDM tones (or signals or carriers).

The preamble chips can be mapped to the OFDM tones and classified by two types—horizontal mapping and vertical mapping. That is, the preamble can be mapped horizontally to some OFDM tones with a predetermined pattern in each frequency bandwidth. Each chip may be mapped to one tone or multi-tones. Furthermore, channel coding scheme can be applied to enhance the reliability of preamble.

Figure 17:
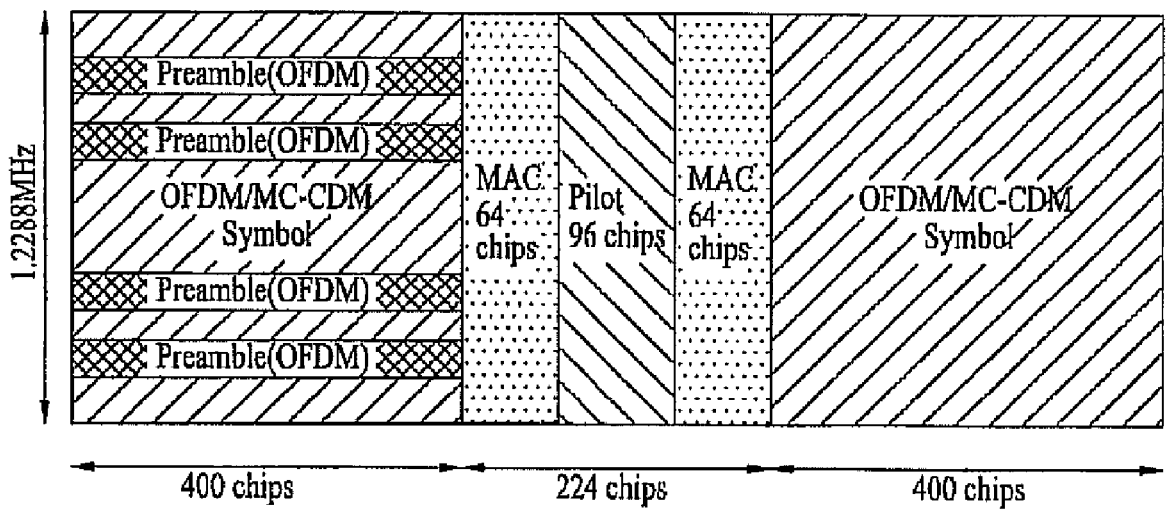
FIG. 17 is an exemplary diagram illustrating horizontal mapping of the preambles.

FIG. 17 is an exemplary diagram illustrating horizontal mapping of the preambles. More specifically, the preambles are mapped to some OFDM tones (or sub-bands) with a predetermined pattern in the OFDM symbol duration. Referring to FIG. 17, the OFDM preambles are horizontally mapped on different tones (or sub-bands) in the 400-chip sub-slot (or quarter slot). The remaining portions not occupied by the OFDM preambles can be occupied by or allocated to OFDM/MC-CDM symbol. As indicated, the duration of the OFDM symbol is 400 chips in 1.25 MHz bandwidth. This example is not limited to this particular bandwidth but can be extended to larger bandwidth.

Figure 18:
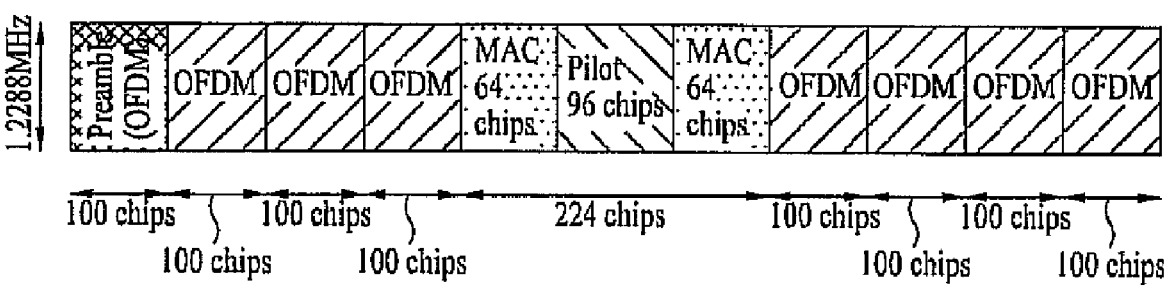
FIG. 18 is an exemplary diagram of vertical mapping of the preamble(s)

FIG. 18 is an exemplary diagram of vertical mapping of the preamble. More specifically, the preamble can be allocated in whole tones (or occupy entire tone) of one or more OFDM symbols. To put differently, the preamble can be allocated to an entire sub-region within the sub-slot defined by a specified duration (or sub-region duration) and the prescribed bandwidth. In FIG. 18, a sub-slot of 400 chips is further divided into smaller slots (hereinafter referred to as "smaller slots"). The duration of the smaller slot, which equals one OFDM symbol duration, can be set to 100 chips and/or multiples thereof. Here, the total preamble duration is 100 chips in the prescribed bandwidth of 1.25 MHz bandwidth. In this example, the preamble for each user can be allocated for each carrier (e.g., Top 1.25 MHz) in the same carrier area in the frequency domain. Alternatively, the preamble for each user can be allocated in an interlaced fashion over the entire bandwidth available in order to maximize on frequency.

Further to the example of FIG. 18, the total preamble duration can be extended and/or repeated, using repetition, to 200 chips, 300 chips, and so on. In other words, more than one OFDM preamble having duration of 100 chips can be used. In turn, the total preamble duration can be 200 chips, 300 chips, and so on. Here, each chip may be mapped to one tone or multi-tones (or one or more smaller slots). Furthermore, channel coding scheme can be applied to enhance the reliability of preamble.

Figure 19:
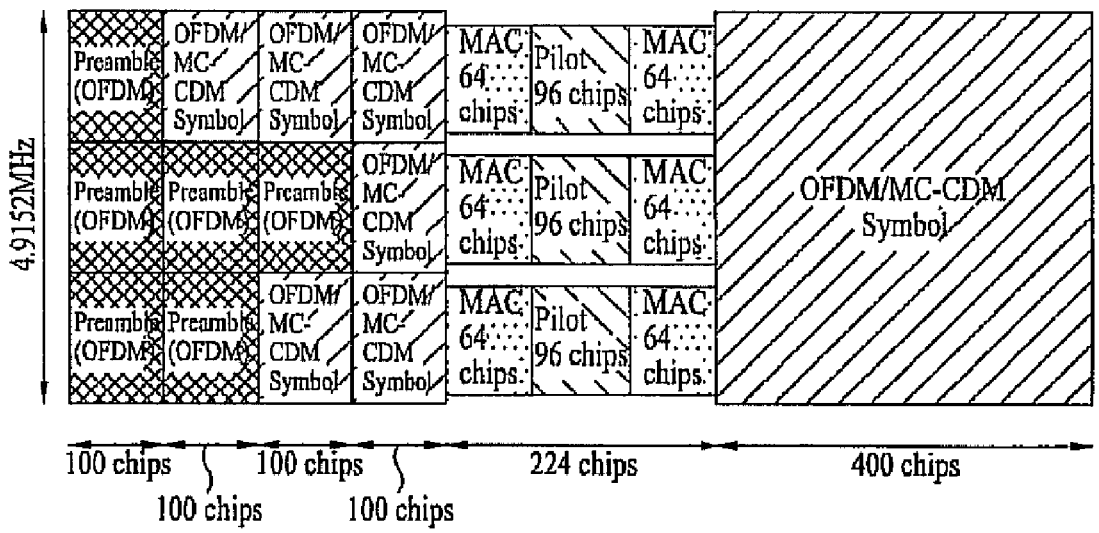
FIG. 19 is another exemplary diagram illustrating vertical mapping of the preamble(s)

FIG. 19 is another exemplary diagram illustrating vertical mapping of the preamble. Referring to FIG. 19, the diagram illustrates extended or repeated OFDM preambles in a 5 MHz bandwidth. As discussed, the OFDM preambles can occupy any one of the 100 chip smaller slots. Preferably, the OFDM preambles are consecutive and/or contiguous. Further, one OFDM symbol duration is 100 chips in preamble part. Here, each OFDM preamble is allocated in whole tones (or entire smaller slot) of at least one OFDM symbol.

Figure 20:
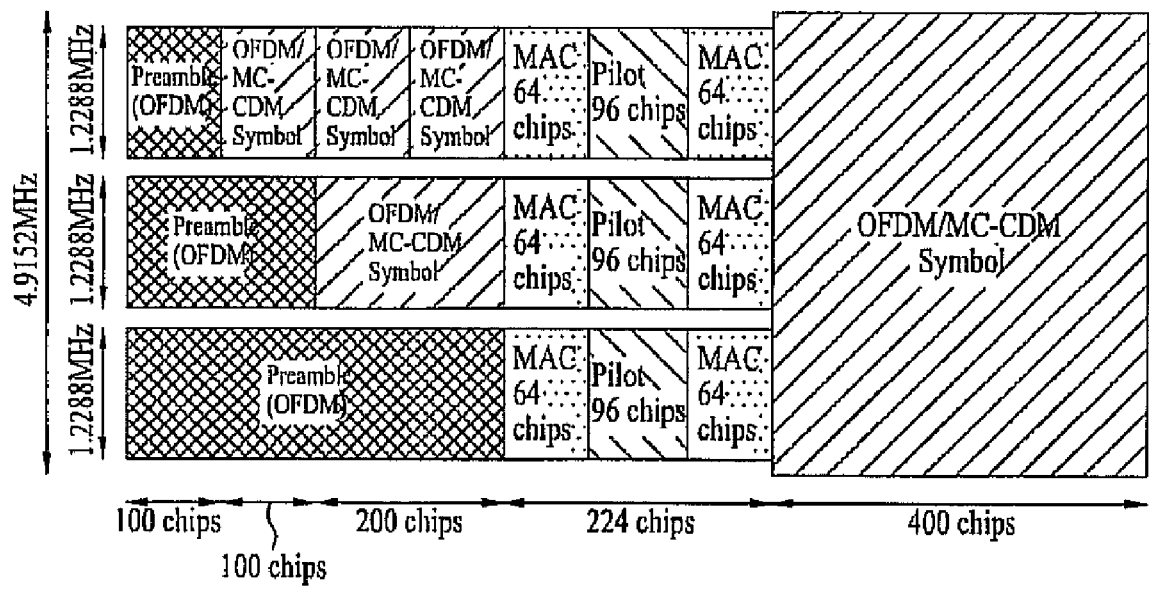
FIG. 20 is another exemplary diagram illustrating vertical mapping of the preamble(s)

FIG. 20 is another exemplary diagram illustrating vertical mapping of the preamble. Referring to FIG. 20, the diagram illustrates variable duration of the OFDM preambles in a multi-carrier system. In addition, 5 MHz bandwidth can be divided into three (3) 1.25 MHz carriers or sub-bands. Each carrier (or sub-band) can have different OFDM preamble duration. Each frequency band or carrier can have OFDM symbol duration of 100 chips, 200 chips, or 400 chips, for example. As such, the duration of the OFDM preambles for each carrier is independent.

Further, the data symbol (e.g., OFDM/MC-CDM symbol) can be allocated to the entire bandwidth. That is, the data symbol is not separated by carriers or sub-bands. As illustrated in the diagram, the data symbol is allocated to the sub-slot having 400 chip duration.

In the discussions above with respect to FIGS. 17-20, different configuration of OFDM preambles in horizontal or vertical directions were presented. In the discussion to follow, the OFDM preambles are combined in horizontal and vertical directions.

Figure 21:
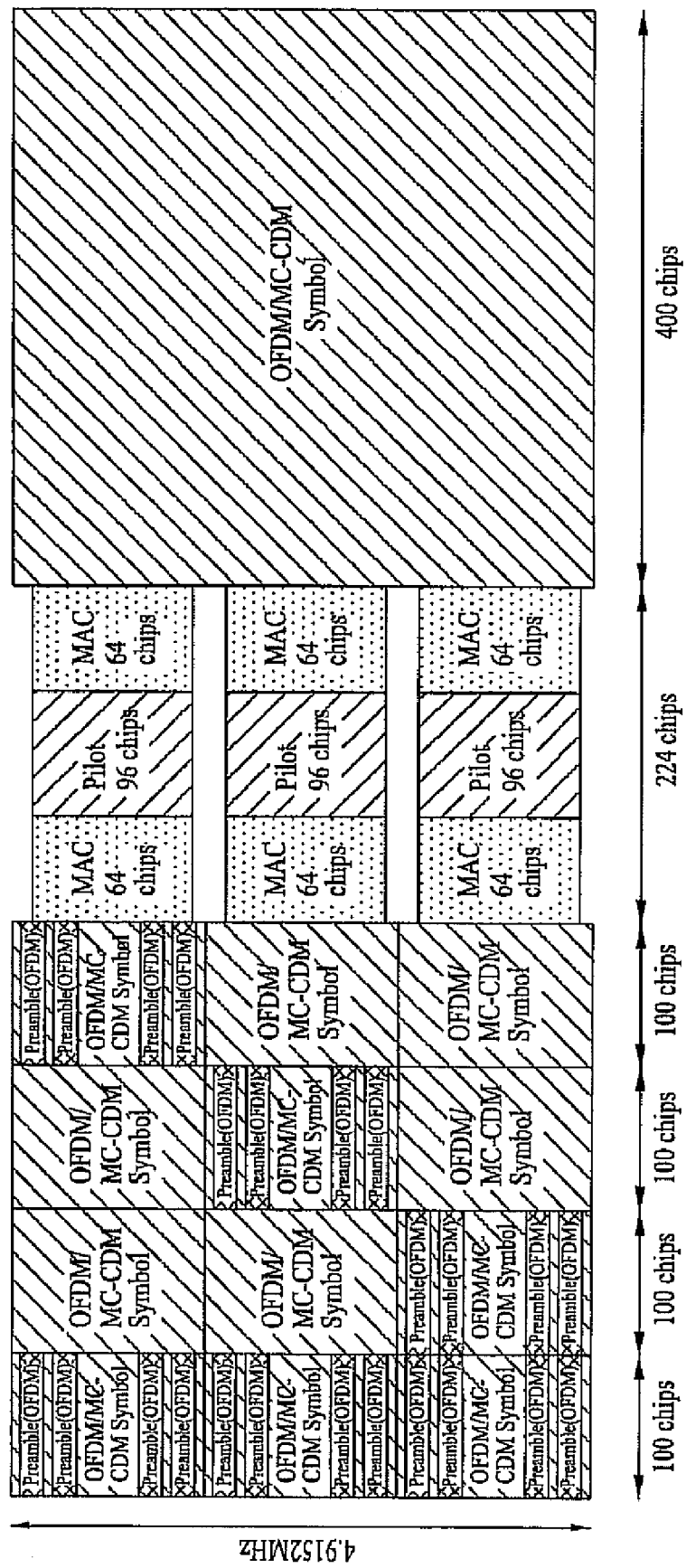
FIG. 21 is an exemplary diagram illustrating combination of horizontal mapping and vertical mapping of the preambles.

FIG. 21 is an exemplary design illustrating combination of horizontal mapping and vertical mapping of the preambles. Referring to FIG. 21, which is a combination of FIGS. 17 and 19, the horizontal mapping of OFDM preambles (or preambles mapped to some of OFDM tones) in 5 MHz bandwidth. The combination of these two mapping schemes allows for more flexible and resource efficient means of mapping the preambles.

As illustrated in FIG. 21, the OFDM preambles can be mapped to some OFDM tones with a predetermined pattern within the further-divided smaller slot, having duration of 000 chips. Here, the horizontal mapping of the preambles is not limited to a 100 chip OFDM symbol duration and can be extended/repeated beyond one OFDM symbol. Furthermore, the 100-chip OFDM symbol duration with the horizontal mapping of the preambles therein does not have to be consecutive or contiguous but can be independent from symbol to symbol. Furthermore, the preamble, comprising a set of sub-carriers and OFDM symbols (100 chops in duration), can be assigned, in general, to any set of sub-carriers or any set of OFDM symbols in the "preamble region" which, in this case, is the first 400 chips over the roughly 5 MHz bandwidth. For example, the preamble need not consist of contiguous sets of tones horizontally nor contiguous sets of tones vertically.

Figure 22:
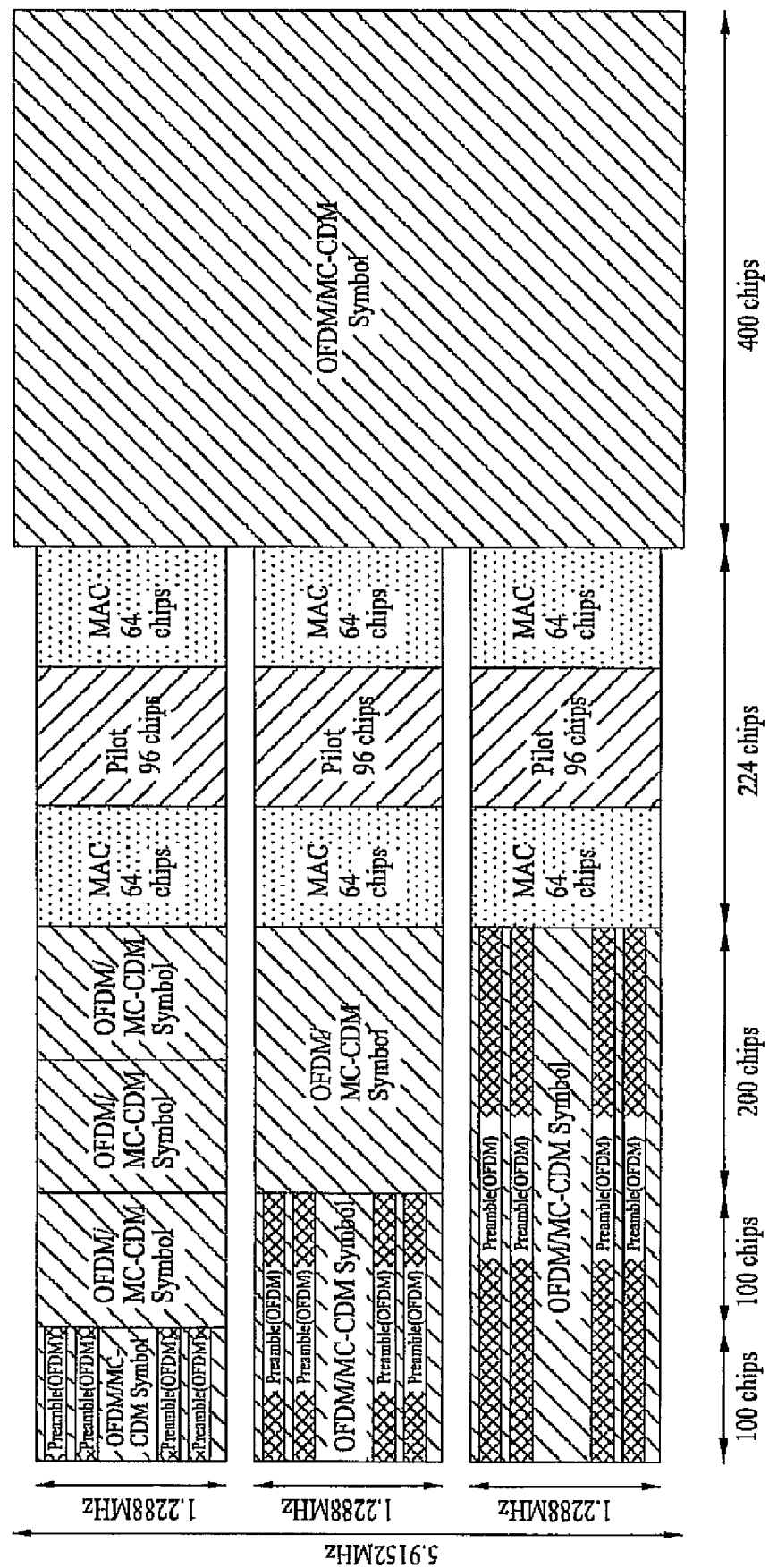
FIG. 22 is another example of horizontal mapping and vertical mapping combination of the preambles.

FIG. 22 is another example of horizontal mapping and vertical mapping combination of the preambles. In FIG. 22, which is a combination of FIGS. 17 and 20, the horizontal mapping of OFDM preambles (or preambles mapped to some of OFDM tones) in each of three 1.25 MHz band or carrier in 5 MHz bandwidth. Here, the OFDM preambles are allocated to tones per carrier of 1.25 MHz having varying durations (e.g., 100 chips, 200 chips, or 400 chips).

Mapping of preamble chips to OFDM tones can be expressed with respect to time and frequency. Here, preamble can be distributed with some patterns in time and frequency domain to exploit frequency and time diversity.

Figure 23:
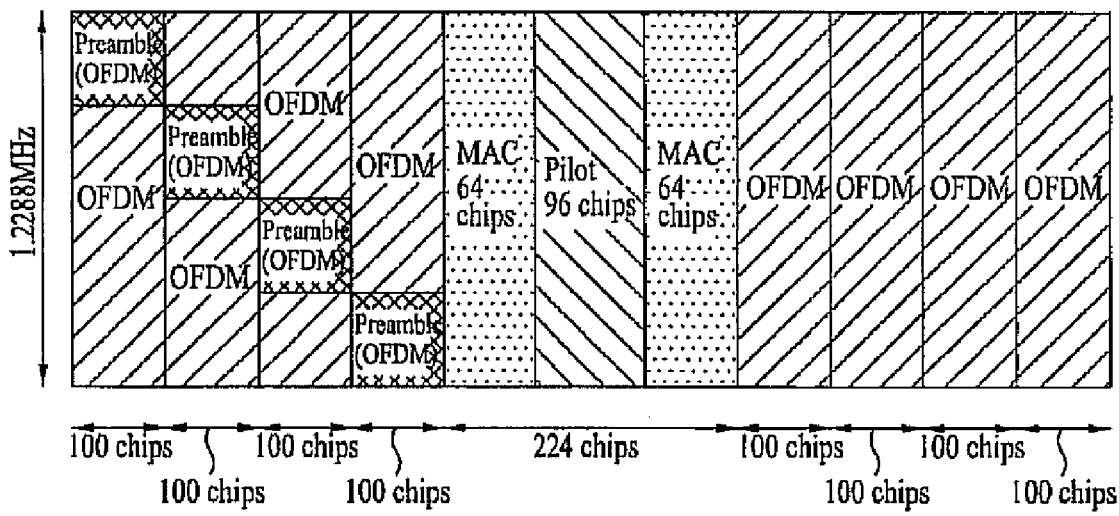
FIG. 23 is an example of time-frequency mapping of OFDM preambles.

FIG. 23 is an example of time-frequency mapping of OFDM preambles. In FIG. 23, four (4) OFDM preambles are allocated in whole tones of four (4) OFDM symbols. Here, the OFDM preambles are allocated to different tones (i.e., frequency) at different chips (i.e., times) from each other in 1.25 MHz bandwidth. This example can be extended to larger bandwidth (e.g., 5 MHz).

As an alternative design to horizontal and/or vertical mapping and/or time-frequency mapping of OFDM preambles, a hybrid mapping can be used. The hybrid mapping scheme includes the aforementioned mapping schemes in addition to using legacy preamble. More specifically, the hybrid mapping can be a combination of legacy preamble and horizontal/vertical/time-frequency mapping.

As discussed, the legacy preamble (e.g., CDM preamble) has duration of 64 bits or 128 bits, and any multiple thereof. The lengths being a multiple of 64 chips and/or 128 chips takes into consideration 1xEV-DO Rev. A and 1xEV-DO Rev. B, respectively.

In hybrid mapping, the first preamble is allocated in the time domain as same as current (conventional) preamble design. That is, the preamble is mapped to whole tone (e.g., 1.25 MHz) of the legacy preamble. However, the remaining chips of the preamble may be mapped to OFDM symbol using horizontal/vertical/time-frequency mapping.

Figure 24:
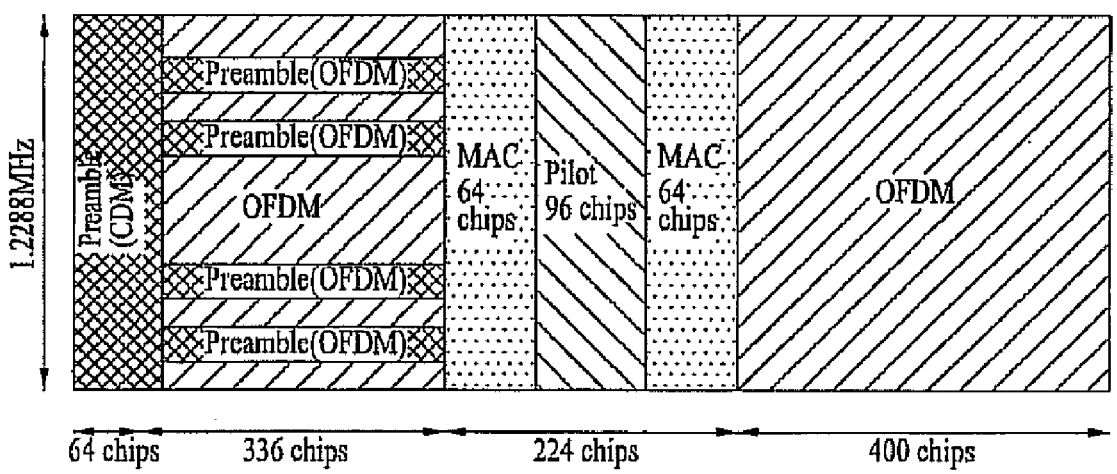
FIG. 24 is an exemplary diagram illustrating hybrid mapping.

FIG. 24 is an exemplary diagram illustrating hybrid mapping. In FIG. 24, one OFDM symbol duration is 400 chips which refer to a sub-slot (or quarter slot). Taking into consideration backward compatibility, 64 chips (or 128 chips) of the OFDM symbol duration is allocated to CDM preamble, and the remaining 336 (or 272 chips) are used to accommodate allocation of OFDM preamble using horizontal mapping in 1.25 MHz bandwidth, in this example. The details of horizontal mapping are discussed in FIGS. 17, 21, and 22. However, mapping of OFDM preamble is not limited to horizontal mapping and other mapping schemes (e.g., vertical or horizontal/vertical combination mapping) can also be used.

Figure 25:
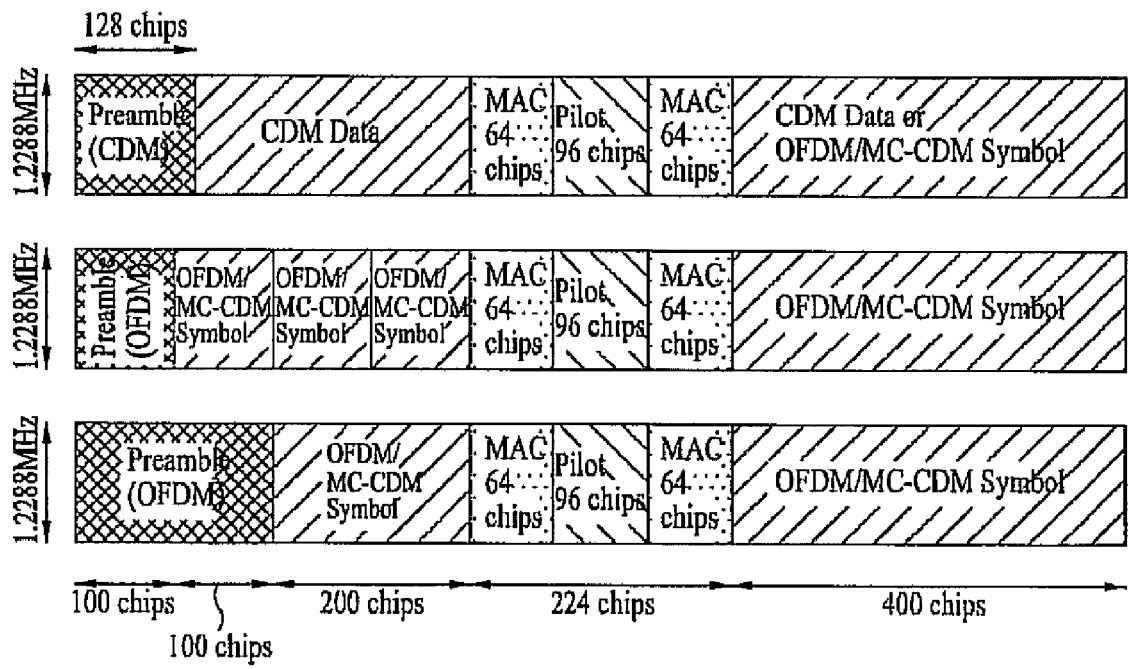
FIG. 25 is another exemplary diagram illustrating hybrid mapping.

FIG. 25 is another exemplary diagram illustrating hybrid mapping. In FIG. 25, the CDM preamble can be used for at least one frequency band, and OFDM preamble can be used for at least one another frequency band. This CDM/OFDM preamble assignment is independent in each frequency band. This is a variation of vertical mapping. However, mapping of OFDM preamble is not limited to vertical mapping as described here and other mapping schemes (e.g., horizontal, horizontal/vertical combination, or time-frequency mapping) can also be used Again, the hybrid mapping takes into consideration backward compatibility. As such, the CDM preamble is used. In one of the frequency band in which the CDM preamble is allocated (e.g., 128 chips), not only can CDM data symbol be included, but OFDM symbol or MC-CDM symbol can also be included in the subsequent data portion having the duration of 400 chips. As for other frequency bands which carry OFDM symbols, the OFDM symbol duration can be different for each frequency band.

Alternatively, the band/carrier carrying CDM preamble followed by CDM data in the leftover portion of the sub-slot is not limited to carrying the CDM data after the CDM preamble. The OFDM symbol can be placed after the CDM preamble.

As another alternative to slot design, the existing CDM can be re-used. To re-use existing CDM preamble design and avoid having various FFT sizes, CDM data symbols may be occupied in the leftover portions in a slot where preamble exists. OFDM symbols may then occupy the next data portion.

Figure 26:
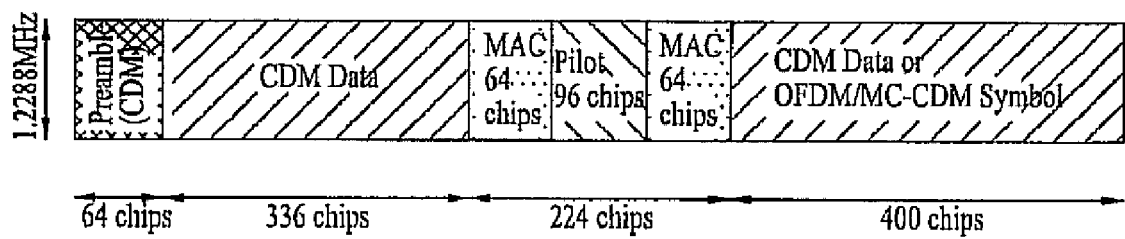
FIG. 26 is an exemplary design of re-using existing CDM preamble.

FIG. 26 is an exemplary design of re-using existing CDM preamble. In this design, one OFDM symbol duration is 400 chips, and the total preamble duration is 64 chips in 1.25 MHz bandwidth. More specifically, the CDM preamble has a duration of 64 chips and is located in front of the first data portion (or sub-slot). Here, the CDM data symbol has duration of 336 chips since the CDM preamble occupies 64 chips out of total of 400 chips. The subsequent data portion can be occupied by any one of the CDM data symbol, the OFDM symbol, or the MC-CDM symbol. In the conventional design, the subsequent data portion was occupied by the CDM data symbol only and did not allow for the OFDM symbol and/or MC-CDM symbol to occupy.

Figure 27:
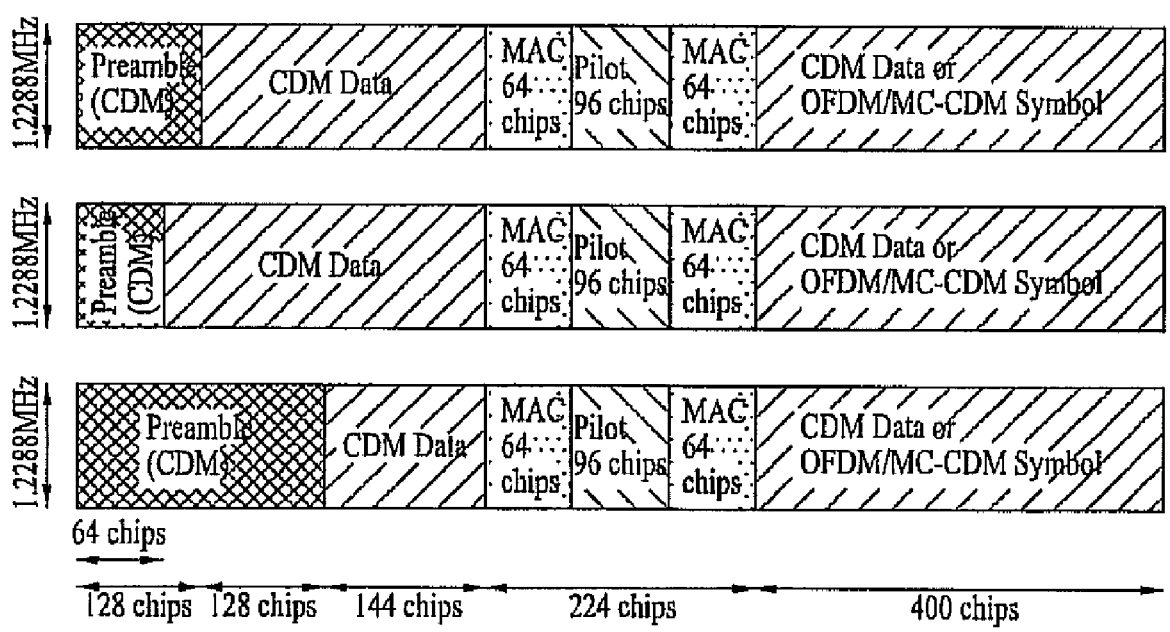
FIG. 27 is another exemplary design of re-using existing CDM preamble.

FIG. 27 is another exemplary design of re-using existing CDM preamble. In this design, the OFDM symbol duration is 400 chips in 5 MHz bandwidth, and each 1.25 MHz frequency carrier can be designed independently to legacy CDM data users or new OFDM users.

As illustrated here, the CDM preamble duration is 64 chips or 128 chips and/or multiples thereof, followed by CDM data in the remaining portions in a sub-slot where preambles exist. As discussed, the duration of the sub-slot can be 400 chips. Here, the duration of the preambles can vary from carrier to carrier. In the subsequent data portion having 400 chip duration, this data portion can be occupied by not only CDM data symbol but also to OFDM/MC-CDM symbols independently per 1.25 MHz carrier so as to accommodate legacy CDM data user(s) and/or OFDM user(s).

Figure 28:
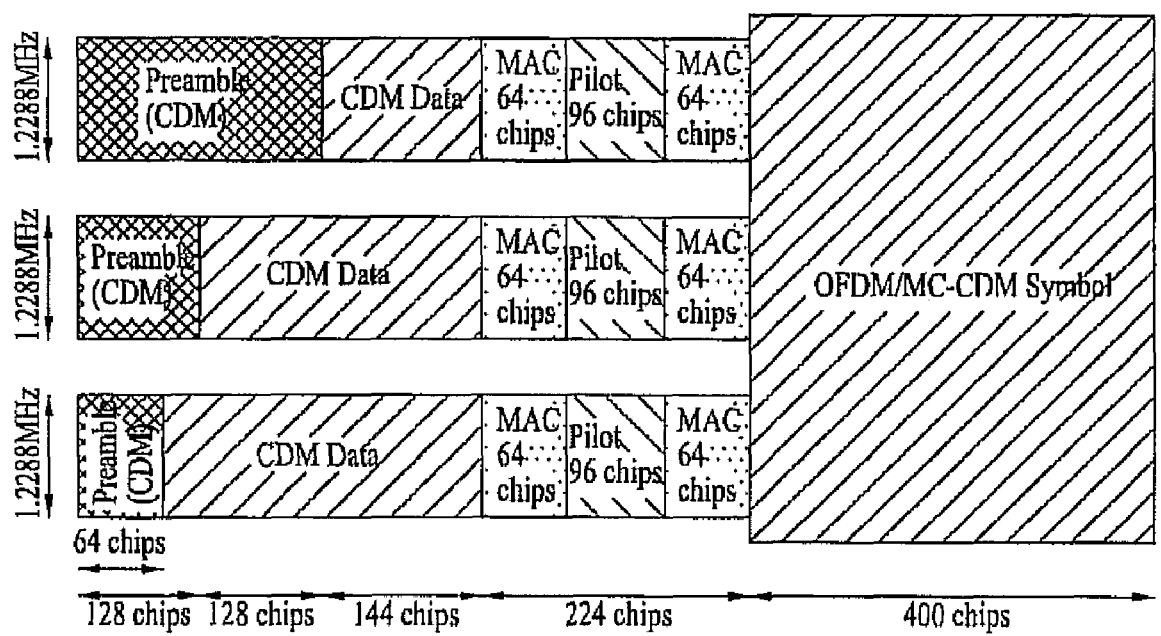
FIG. 28 is another exemplary design of re-using existing CDM preamble.

FIG. 28 is another exemplary design of re-using existing CDM preamble. In this design, the whole 5 MHz bandwidth is allocated to new OFDM users at a specific time slot with OFDM symbol duration of 400 chips. Further, the whole 5 MHz bandwidth can be used without gap in between 1.25 MHz band. In other words, more bandwidth can be used. Specifically, 4.9152 MHz in 5 MHz bandwidth can be used compared to 3.6864 MHz in 5 MHz bandwidth in FIG. 14. In FIG. 14, three (3) 1.2288 MHz (3×1.2288 MHz=3.6864 MHz) are used to carry OFDM/MC-CDM symbols. In FIG. 28, however, the gap(s) between the bands (or carriers) can be eliminated and used as a part of the OFDM/MC-CDM symbol.

Figure 29:
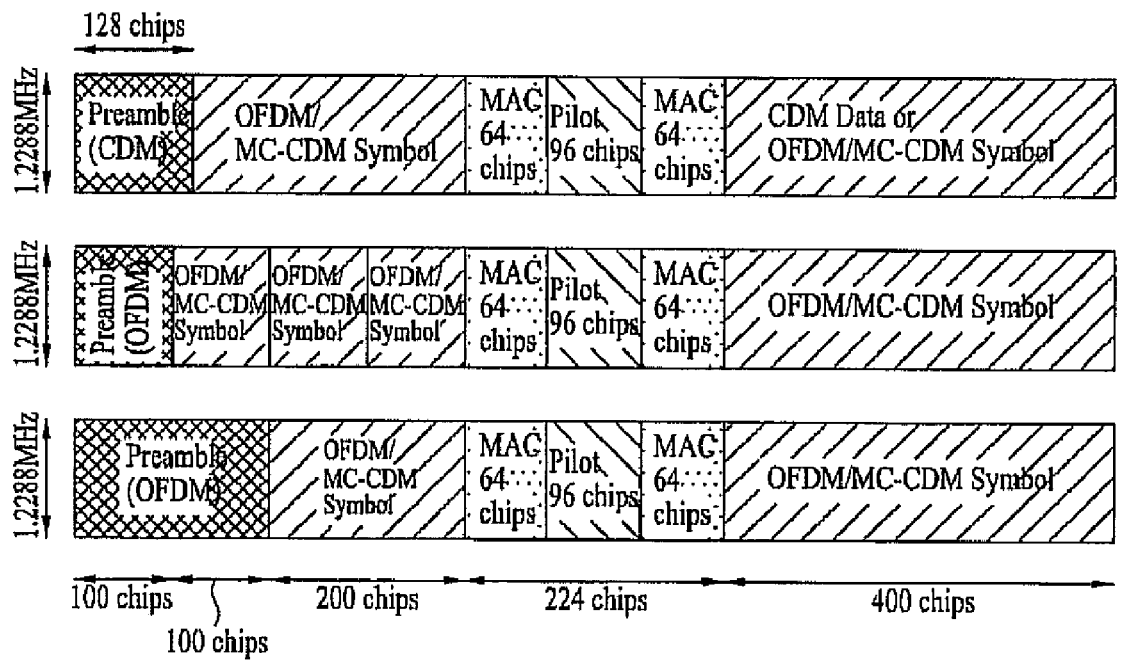
FIG. 29 is an exemplary diagram illustrating a variation of FIG. 12 in which OFDM/MC-CDM symbol is placed immediately after the CDM preamble.
Figure 30:
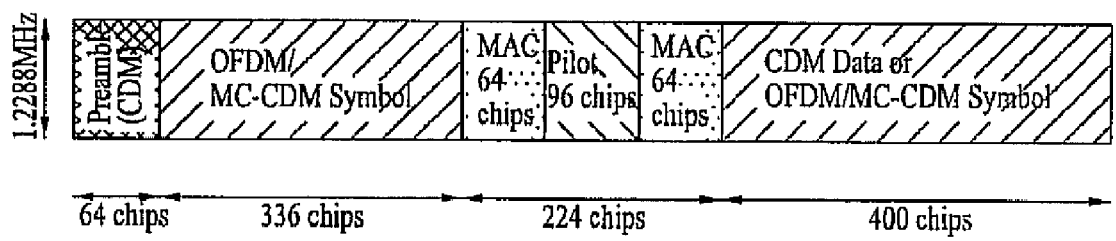
FIG. 30 is an exemplary diagram illustrating re-using existing CDM preamble with OFDM/MC-CDM symbol placed immediately after the CDM preamble.
Figure 31:
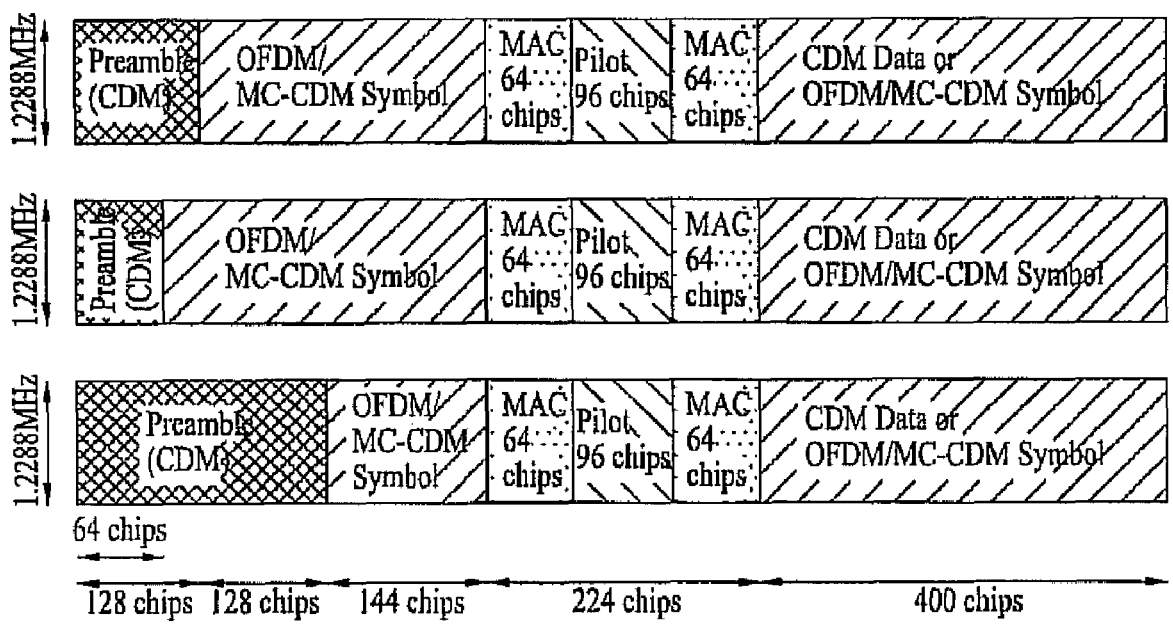
FIG. 31 is another exemplary diagram illustrating re-using existing CDM preamble with OFDM/MC-CDM symbol placed immediately after the CDM preamble.
Figure 32:
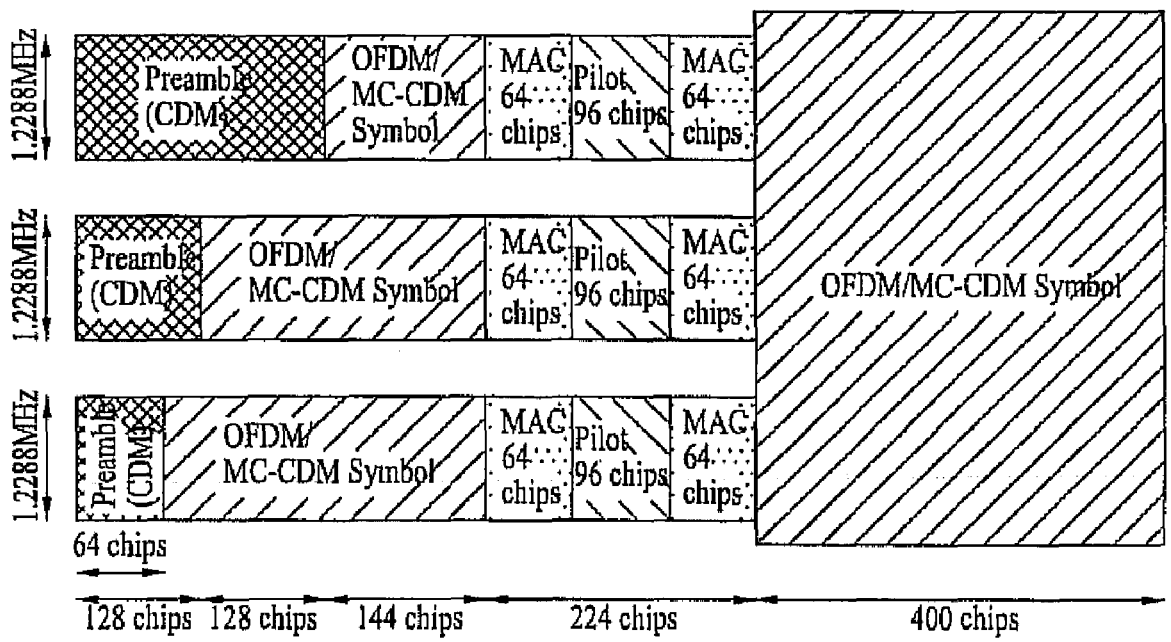
FIG. 32 is another exemplary diagram illustrating re-using existing CDM preamble with OFDM/MC-CDM symbol placed immediately after the CDM preamble.

Alternatively, the OFDM symbols can be placed immediately after the preamble. In FIG. 29, compared to FIG. 25 in which the CDM data symbol is placed immediately after the CDM preamble, OFDM/MC-CDM symbol can be placed immediately after the CDM preamble. Similarly, FIGS. 30, 31, and 32 are other exemplary designs of re-using existing CDM preamble. These figures are designed so as to provide the OFDM/MC-CDM symbol to be placed immediately after the CDM preamble.

Here, in placing the OFDM symbols immediately after the CDM preamble, the OFDM symbols need to fit into durations of the sub-slot which is 400 chips, for example. Moreover, as discussed, the CDM preamble durations can be multiple of 64 chips or 128 chips. As such, if the sub-slot is 400 chips and the CDM preamble is 64 chips, then 336 chips remain for the OFDM symbol. In other words, the OFDM symbol has duration of 336 chips. Similarly, 400 chips minus 128 chips of CDM preamble duration leaves 272 chips for the OFDM symbol. Furthermore, if the CDM preamble duration is 256 chips and the slot has duration of 400 chips, then the OFDM symbol has duration of 144 chips.

If the CDM preamble duration exceeds 400 chips, then two sub-slots (or quarter slots) can be used whose combined duration is 800 chips. For example, if the CDM preamble duration is 512 chips, then the OFDM symbol duration can be 288 chips (800 chips−512 chips=288 chips). Further, if the CDM preamble duration exceeds 800 chips, then three sub-slots can be used whose combined duration is 1200 chips. For example, if the CDM preamble duration is 1024 chips, then the OFDM symbol duration can be 176 chips (1200 chips−1024 chips=176 chips).

As discussed, there are four sets of 400 chip data sub-slots (or quarter slots). When using CDM preambles, the OFDM symbols in the second, third, and fourth sub-slots can use the full bandwidth. That is, there are no gaps between different bands or carriers in the second, third, and fourth sub-slots.

Further, in OFDM preamble designs, we can use instead MC-CDMA preambles. For example, Walsh-Hadamard (WH) codes can be used to identify a user Gust as in NxEV-DO). The code can be directly assigned on to the MC-CDMA tones or can be transmitted via a discrete Fourier transform (DFT)-CDMA (i.e., SC-FDMA). For example, given 100 chip durations, use a 64 chip WH code. If, there are 80 sub-carriers, then there are 16 tones left. These can be used for other purposes (e.g., carrying data instead of the preamble).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A computer implemented method of configuring a data packet including an orthogonal frequency division multiplexing (OFDM) preamble in a wireless communication system, the method comprising:
    configuring the data packet, by a base station (BS), to include the OFDM preamble in a first region, a pilot and medium access control (MAC) information in a second region, and a data symbol in a third region;
    allocating the OFDM preamble, by the BS, to at least one but not all of a plurality of sub-bands of a prescribed bandwidth in the first region while allocating the OFDM preamble across an entire time duration of the first region; and
    allocating the data symbol, by the BS, to at least one of the plurality of sub-bands of the prescribed bandwidth in the first region not occupied by the OFDM preamble.

2. The method of claim 1, wherein the data symbol is an orthogonal frequency division multiplexing (OFDM) symbol or a multi-carrier code division multiplexing (MC-CDM) symbol.

3. The method of claim 1, wherein the first region includes at least one sub-region.

4. The method of claim 3, wherein the OFDM preamble is allocated to the at least one sub-region having a fixed time duration.

5. A computer implemented method of configuring a data packet including an orthogonal frequency division multiplexing (OFDM) preamble in a wireless communication system, the method comprising:
    configuring the data packet, by a base station (BS), to include the OFDM preamble in a first region, a pilot and medium access control (MAC) information in a second region, and a data symbol in a third region;
    allocating the OFDM preamble, by the BS, to all of a plurality of sub-bands of a prescribed bandwidth in the first region while allocating the OFDM preamble across at least one but not all of a plurality of sub-regions of the first region; and
    allocating the data symbol, by the BS, to at least one of the plurality of sub-bands of the prescribed bandwidth across at least one of the plurality of sub-regions of the first region not occupied by the OFDM preamble.

6. The method of claim 5, wherein the data symbol is an orthogonal frequency division multiplexing (OFDM) symbol or a multi-carrier code division multiplexing (MC-CDM) symbol.

7. The method of claim 5, wherein each of the at least one of the plurality of sub-regions across which the OFDM preamble is allocated have a different number of the plurality of sub-bands to which the OFDM preamble is allocated.

8. The method of claim 7, wherein each of the at least one of the plurality of sub-regions across which the OFDM preamble is allocated have a same time duration.

9. A method of configuring a data packet including an orthogonal frequency division multiplexing (OFDM) preamble in a wireless communication system, the method comprising:
    configuring the data packet, by a base station (BS), to include the OFDM preamble in a first region, a pilot and medium access control (MAC) information in a second region, and a data symbol in a third region, wherein a prescribed bandwidth in the first region is divided into a plurality of sub-band regions;

allocating the OFDM preamble, by the BS, to all of the plurality of sub-band regions of the prescribed bandwidth in the first region while allocating the OFDM preamble across at least one of one or more time durations of the first region; and allocating the data symbol, by the BS, to at least one of the plurality of sub-band regions of the prescribed bandwidth across at least one of the time durations of the first region to which the OFDM preamble is not allocated, wherein the OFDM preamble of each of the plurality of sub-band regions is allocated across a different one of the one or more time durations of the first region.

10. The method of claim 9, wherein the data symbol is an orthogonal frequency division multiplexing (OFDM) symbol or a multi-carrier code division multiplexing (MC-CDM) symbol.

11. A method of configuring a data packet including an orthogonal frequency division multiplexing (OFDM) preamble in a wireless communication system, the method comprising:

configuring the data packet, by a base station (BS), to include the OFDM preamble in a first region, a pilot and medium access control (MAC) information in a second region, and a data symbol in a third region, wherein the first region is divided into a plurality of time sub-durations;

allocating the OFDM preamble, by the BS, to at least one of a plurality of sub-bands of a prescribed bandwidth in the first region while allocating the OFDM preamble across a corresponding one of the plurality of time sub-durations of the first region; and allocating the data symbol, by the BS, to at least one of the plurality of sub-bands of the prescribed bandwidth across at least one of the plurality of time sub-durations of the first region to which the OFDM preamble is not allocated, wherein each of the plurality of time sub-durations to which OFDM preamble is allocated has the OFDM preamble allocated to different sub-bands of the plurality of sub-bands.

12. The method of claim 11, wherein the data symbol is an orthogonal frequency division multiplexing (OFDM) symbol or a multi-carrier code division multiplexing (MC-CDM) symbol.

13. A method of configuring a data packet including a code division multiplexing (CDM) preamble and an orthogonal frequency division multiplexing (OFDM) preamble in a wireless communication system, the method comprising:

configuring the data packet, by a base station (BS), to include the CDM preamble and the OFDM preamble in a first region, a pilot and medium access control (MAC) information in a second region, and a data symbol in a third region;

allocating the CDM preamble, by the BS, to all of a plurality of sub-bands of a prescribed bandwidth in a first sub-region of the first region while allocating the CDM preamble across an entire time duration of the first sub-region;

allocating the OFDM preamble, by the BS, to at least one but not all of the plurality of sub-bands of the prescribed bandwidth in a second sub-region of the first region while allocating the OFDM preamble across an entire time duration of the second sub-region; and allocating the data symbol, by the BS, to at least one of the plurality of sub-bands of the prescribed bandwidth in the second sub-region to which the OFDM preamble is not allocated.

14. The method of claim 13, wherein the data symbol is an orthogonal frequency division multiplexing (OFDM) symbol or a multi-carrier code division multiplexing (MC-CDM) symbol.

* * * * *